US012367739B2

(12) United States Patent
Bulzacki et al.

(10) Patent No.: US 12,367,739 B2
(45) Date of Patent: Jul. 22, 2025

(54) SYSTEMS AND METHODS FOR TRACKING GAMING ACTIVITY

(71) Applicant: ARB LABS INC., Toronto (CA)

(72) Inventors: Adrian Bulzacki, Mississauga (CA); Vlad Cazan, Thornhill (CA); Andrzej Kepinski, Toronto (CA); Alexander George Stal, Grimsby (CA)

(73) Assignee: ARB LABS INC., Toronto (CA)

( * ) Notice: Subject to any disclaimer, the term of this patent is extended or adjusted under 35 U.S.C. 154(b) by 375 days.

(21) Appl. No.: 18/015,286

(22) PCT Filed: Jul. 7, 2021

(86) PCT No.: PCT/CA2021/050933
§ 371 (c)(1),
(2) Date: Jan. 9, 2023

(87) PCT Pub. No.: WO2022/006674
PCT Pub. Date: Jan. 13, 2022

(65) Prior Publication Data
US 2023/0260363 A1   Aug. 17, 2023

Related U.S. Application Data

(60) Provisional application No. 63/049,061, filed on Jul. 7, 2020.

(51) Int. Cl.
*G07F 17/32* (2006.01)
*G06T 7/246* (2017.01)
(Continued)

(52) U.S. Cl.
CPC .......... *G07F 17/3237* (2013.01); *G06T 7/246* (2017.01); *G06T 7/292* (2017.01);
(Continued)

(58) Field of Classification Search
CPC . G07F 17/32; G06T 7/80; G06T 7/292; G06T 7/246; G06V 20/52; G06V 10/40
See application file for complete search history.

(56) References Cited

U.S. PATENT DOCUMENTS

2005/0272501 A1\* 12/2005 Tran .................... G07F 17/3241
463/29
2009/0124379 A1\* 5/2009 Wells ...................... G07F 17/32
463/31

(Continued)

FOREIGN PATENT DOCUMENTS

| WO | 2016/191856 A1 | 12/2016 |
| WO | 2018227294 A1 | 12/2018 |
| WO | 2019068141 A1 | 4/2019 |

OTHER PUBLICATIONS

Canadian Intellectual Property Office (CIPO), International Search Report & Written Opinion to PCT/CA2021/050933, Sep. 21, 2021.

(Continued)

*Primary Examiner* — Reginald A Renwick
(74) *Attorney, Agent, or Firm* — Norton Rose Fulbright Canada LLP

(57) ABSTRACT

A system for monitoring gaining activities associated with a gaming surface, the system including a gaming equipment having the gaining surface and a display system connected to the gaming equipment, such as an improved limit sign. The system also includes device camera connected on the display system having a first field of view tracking, for example, betting markers, gaining tokens, a gaming participant and, the gaming surface. The system can interoperate with other camera systems to establish a common coordinate space for coordinated image processing and machine learning based on model representations of a spatial space using the common coordinate space. The calibration can occur dynamically to automatically adjust for camera reconfigurations.

20 Claims, 29 Drawing Sheets

(51) Int. Cl.
    *G06T 7/292*     (2017.01)
    *G06T 7/80*     (2017.01)
    *G06V 10/40*     (2022.01)
    *G06V 20/52*     (2022.01)

(52) U.S. Cl.
    CPC ............... *G06T 7/80* (2017.01); *G06V 10/40* (2022.01); *G06V 20/52* (2022.01); *G06T 2207/10016* (2013.01); *G06T 2207/10024* (2013.01); *G06T 2207/30196* (2013.01); *G06T 2207/30232* (2013.01)

(56) References Cited

U.S. PATENT DOCUMENTS

| | | | |
|---|---|---|---|
| 2017/0046568 A1 | 2/2017 | Bulzacki et al. | |
| 2020/0034629 A1* | 1/2020 | Vo et al. | |
| 2022/0327886 A1* | 10/2022 | Mathur | G06T 19/006 |
| 2024/0013617 A1* | 1/2024 | Arbogast | G07F 17/3241 |

OTHER PUBLICATIONS

European Patent Office, Extended European Search Report to EP 21837903.0, Jul. 17, 2024.

Malm H et al: "Stereo head calibration from a planar object", Proceedings 2001 IEEE Conference on Computer Vision and Pattern Recognition. CVPR 2001. Kauai, Hawaii, Dec. 8-14, 2001; [Proceedings of the IEEE Computer Conference on Computer Vision and Pattern Recognition], IEEE Computer Society, Los Alamitos, C, vol. 2, Dec. 8, 2001 (Dec. 8, 2001), pp. 657-662, XP010584187, ISBN: 978-0-7695-1272-3.

Ilie A et al: "Ensuring color consistency 3-10,13 across multiple cameras", Computer Vision, 2005. ICCV 2005. Tenth IEEE International Conference on Beijing, China Oct. 17-20, 2005, Piscataway, NJ, USA, IEEE, Los Alamitos, CA, USA, Oct. 17, 2005 (Oct. 17, 2005), p. 1268, XP031668599, ISBN: 978-0-7695-2334-7.

* cited by examiner

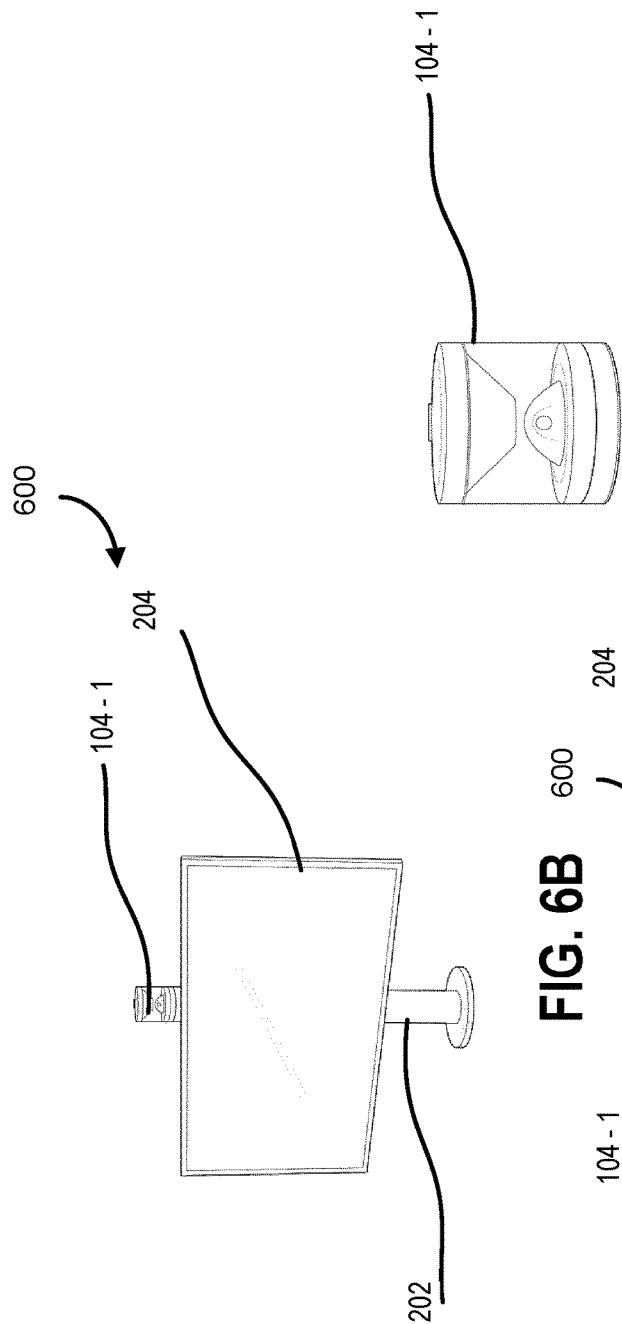
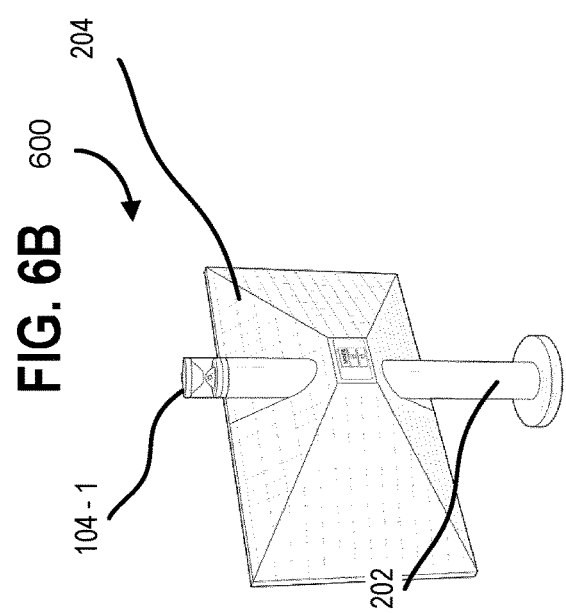
FIG. 6C
FIG. 6B
FIG. 6A

SYSTEMS AND METHODS FOR TRACKING GAMING ACTIVITY

CROSS-REFERENCE

This application is a non-provisional of, and claims all benefit, including priority to, U.S. Application No. 63/049,061, filed 2020 Jul. 7, entitled System and Methods for Tracking Gaming Activity, incorporated herein by reference in its entirety.

FIELD

Embodiments of the present disclosure generally relate to the field of tracking gaming activity, and more specifically, embodiments relate to tracking gaming activity with video data.

INTRODUCTION

Existing methods of tracking gaming activity are reliant upon human participants reviewing video data to determine whether an infraction has occurred.

Methods of determining gaming participant gaming motions include an employee confirming gestures used in games such as a "hit" or "stand" gesture.

Systems and methods of tracking gaming activity accurately through video data are desirable.

SUMMARY

Automated systems for using image or video data to track gaming activities face technical challenges in respect of obstructions (deliberate or unintentional), changing illumination environments, limited computing and networking resources. These challenges impede the ability of the system to accurately and effectively generate computer-based estimated determinations that various events have taken place.

However, such systems are also desirable in that improved analytics are useful in providing an automated tool in automatically promoting fair play and preventing malicious actors from malicious activities, such as stealing, counterfeiting, or modifying gaming odds, among others. An automated tool is especially useful as recorded evidence and information can be used as baseline evidence for asserting a specific sequence of events that had taken place in the event of a dispute, and can also be used to provide an additional level of sanity checking to ensure that various reconciliations take place to ensure that counterfeit tokens are not inserted into circulation, and that gaming tokens, such as playing cards, are not altered or modified for use.

As described in various embodiments herein, video based camera systems are described that utilize imaging components that automatically observe specific fields of view, and track gaming activities that take place within the fields of view. In a first aspect, multiple video cameras are coupled to interoperate together through electronic communication such that at least two fields of view that overlap at a particular region can use a calibrating surface or aid in that overlapping region for calibration of their internal spatial representations so that the multiple video cameras can operate based on a common coordinate and/or color system when information from the cameras is processed for event/artifact extraction.

The common coordinate or color system can be represented, for example, in maintained transform matrices that are established periodically or dynamically for each camera so that the transform matrices can be used to rectify the images captured from various perspectives and camera characteristics (e.g., distortion, color space aberrations) such that a coordinated spatial representation can then be utilized, either for local processing before transmission to a backend monitoring system, or by the backend monitoring system to establish a spatial representation of aspects of the gaming facility and gaming activities in a common two or three dimensional representation. Local processing is useful to reduce network traffic, but a challenge is that enhanced hardware needs to be provided at the table level. Conversely, if the processing is done at a backend level, bandwidth requirements may be high (e.g., enough to transfer high resolution video, but relatively simple computing processes can be used at the local level.

The system, in accordance with various embodiments, can be directed to tracking physical objects proximate to a gaming surface, such as betting markers (e.g., chips, plaques), gaming tokens (e.g., playing cards), players, dealers, and observe the movement and shifting of these physical objects over time. A machine learning representation is utilized to establish point-in-time representations of geospatial characteristics of the physical objects through transformation of the raw image data using the perspective and/or color transforms, and these can be utilized for further processing where the representations can be processed to determine, for example, whether infractions have occurred (e.g., appendage has entered a proximity zone around a betting area having wagers placed in it during a duration of time when no modifications are allowed to bets, and the number of tokens in the betting area changed during this time.

As multiple cameras can operate together in conjunction in the common coordinate system, it becomes more difficult for malicious users to deliberately impede or obstruct cameras, as cooperating cameras can be embedded, for example, in a dealer tray observing betting markers placed in betting areas, in a dealer tray observing betting markers disposed in channels therein, in overhead cameras, in cameras embedded in network enabled digital signage (e.g., a limit sign), among others. Furthermore, the camera-enabled devices, such as digital signage, may be spatially positioned relative to one another such that the camera-enabled devices are able to oversee other gaming surfaces as well, and thus provide an additional point of reference or perspective for a particular gaming surface (e.g., a Baccarat table in a pit of Baccarat table, being covered by three camera systems installed in the three proximate Baccarat tables, each of the camera systems interoperating with one another to provide redundant coverage in the event of obstruction.

As the game play progresses, the cameras continuously monitor the events and can generate computer predicted event outputs, such as hands being played, movements of betting markers and gaming tokens as they enter/exit play or are placed in betting areas, among others. Furthermore, the events can include activation and de-activation events, such as the rolling of dice, gestures indicating the beginning or stop of a particular hand or round, among others, which can then be utilized to track a state of play that can then be used to assess whether infractions occurred.

The system can also be configured to track human beings and portions thereof, for example, through skeletal representations that may be overlaid or otherwise augmented onto the images such that arms, legs, hands, fingers, etc. can be tracked individually based on the image data in the common coordinate space, and similarly, the skeleton movement data can be used for machine based determinations, such as associating whether a particular betting marker is owned by a particular individual, tracking to see if the individual caused an infraction, among others. In some embodiments, the skeleton movement data can also be utilized to track other types of gesture information, such as whether there was movement data prior to an infraction that may indicate that there was a pre-existing intention that may be used, depending on the rules and policies of a particular gaming institution, to allow a minor infraction, among others.

Embodiments described herein introduce a system for monitoring gaming activities associated with a gaming surface, the system including a gaming equipment having the gaming surface and a display system connected to the gaming equipment. The system also includes an imaging device connected on the display system having a first field of view of a gaming participant and the gaming surface, the imaging device configured to generate frame data, and at least one processor, in communication with the at least one computer memory and the imaging device, configured to receive the frame data from the imaging device. The processor processes the frame data by extracting a feature of the gaming participant from a first frame of the frame data and updates a model representation of the gaming activities with the feature of the gaming participant in the first field of view. The processor further determines whether an infraction threshold is satisfied based on the updated model representation.

In example embodiments, the processor is further configured to process a second frame of the frame data to update the feature of the gaming participant in the first field of view, and update the model representation to include the updated feature of the gaming participant in the first field of view. Determining whether the infraction threshold is satisfied is based on the updated model representation.

In example embodiments, the feature of the gaming participant is an appendage, and the processor is further configured to determine whether the frame is within a gaming duration, and determine whether the infraction threshold is satisfied based on initializing a pre-defined betting zone of the gaming surface into the model representation. In response to determining the appendage overlaps the pre-defined betting zone, the processor determines that the infraction threshold is satisfied.

In example embodiments, the feature of the gaming participant is an appendage, and the processor is further configured to determine whether the infraction threshold is satisfied based on determine whether the frame is within a gaming duration, determine whether the infraction threshold is satisfied based on initializing a pre-defined betting zone of the gaming surface and in response to determining the appendage overlaps the pre-defined betting zone in either a first frame or a second frame, determining that the infraction threshold is satisfied.

In example embodiments, the processor being configured to determine whether the frame is associated with a gaming duration by processing the first frame to determine whether a gaming start object is present.

In example embodiments, the processor being configured to determine whether the frame is associated with a gaming duration by determining whether the gaming start object is absent in the first frame and present in the second frame.

In example embodiments, the feature is an appendage, and the processor is further configured to process the first frame to extract a gaming token feature, process the second frame to update the gaming token feature, and update the model representation with the feature of the gaming token feature and the updated gaming token feature. In some cases, determining whether the infraction threshold is satisfied includes determining whether the updated gaming token feature is overlapped by a stranger appendage.

In example embodiments, the feature is a hand of the gaming participant, and the computer processor is further configured to retrieve a gesture definition database having one or more gesture definitions associated with feature changes over successive frames. In some cases, determining whether the infraction threshold is satisfied comprises determining whether the feature and the updated feature of the model representation satisfy a similarly criteria with any of the one or more gesture definitions.

In example embodiments, the gaming gesture is a hit gesture or a stay gesture.

In example embodiments, the feature of the gaming participant is a gaze of the gaming participant, and the computer processor determining whether the infraction threshold is satisfied comprises determining whether the gaze is indicative of participation.

In example embodiments, the computer processor is further configured to process the feature and the updated feature of the gaming participant with a pose recognizer to identify a pose of the gaming participant and determine whether the infraction threshold is satisfied based on whether the identified pose is indicative of suspicious or disqualifying behaviour.

In example embodiments, the system further includes an infrared imaging device mounted on the display system in a second orientation relative to the gaming surface, the infrared imaging device generating infrared frame data having a representation of the gaming participant and the gaming surface. The at least one processor further configured to receive the infrared frame data from the infrared imaging device and process the infrared frame data by extracting, from a first infrared frame of the infrared frame data, an infrared feature of the gaming participant.

In example embodiments, the infrared feature is a hand of the gaming participant, and the computer processor is further configured to process a second infrared frame of the infrared frame data to identify an updated hand of the gaming participant and retrieve a gesture definition database having one or more gesture definitions associated with feature changes over successive frames. The processor updates the model representation with the hand and updated hand of the gaming applicant, wherein determining whether the infraction threshold is satisfied comprises determining whether the hand and the updated hand of the model representation satisfy a similarly criteria with any of the one or more gesture definitions.

In example embodiments, the computer processor is further configured to temporally synchronize the infrared frame data with the frame data.

In example embodiments, the computer processor is further configured to process the first infrared frame to determine a gaming token object infrared feature, and process a second infrared frame to update the infrared feature and the gaming token object infrared feature. Determining whether an infraction threshold is satisfied based on the updated model representation comprises determining whether the updated gaming token object infrared feature changed from the gaming token object infrared feature without the infrared feature overlapping the gaming token object infrared feature.

In example embodiments, the system further includes a second imaging device in an additional orientation relative to the gaming surface, the second imaging device generating additional frame data from a second field of view. The at least one processor is configured to receive the additional frame data from the second imaging device determine an additional gaming equipment calibration parameter based on a reference object visible in both the additional frame data and the frame data, and augment the model representation to include the additional frame data of the second field of view as being associated with the frame data of the first field of view based on the additional gaming equipment calibration parameter. The processor further processes the additional frame imaging data by in response to determining the gaming participant in the frame data disappears from the first field of view and had exhibited indications of movement towards the second field of view, extract an additional feature from the additional frame having a degree of similarity with the gaming participant, and updating the model representation with the additional feature of the gaming participant in the second field of view. Determining whether the infraction threshold is satisfied is based on the updated model representation.

In example embodiments, the computer is further configured to, in response to determining the infraction threshold is satisfied, transmit an alert to a security system.

In one aspect, a system for monitoring gaming activities is disclosed, the system including a gaming equipment having a gaming surface for a gaming participant to initiate gaming activities, a display system connected to the gaming equipment, and an imaging device mounted on the display system in a first orientation relative to the gaming surface, the imaging device generating frame data having a representation of a gaming object and the gaming surface from a first field of view. The system includes at least one processor, in communication with the at least one computer memory and the imaging device, configured to receive the frame data from the imaging device and process the frame data by processing a first frame of the frame data to extract a feature of the gaming object, and updating a model representation of the gaming activities with the feature of the gaming object in the first field of view. Determining whether an infraction threshold is satisfied based on the updated model representation.

In example embodiments, the gaming object is a gaming token, and whether an infraction threshold is satisfied is based on initializing a starting expected location of the gaming token within the model representation for a first duration of the gaming activity, receiving a second frame data from the imaging device, and augmenting the model representation to include an expected final location of the gaming token at based on the second frame data. Whether the infraction threshold is satisfied is also based on processing the second frame of the frame data to extract a final location of the gaming object, and determining whether the final location of the gaming object is within a threshold distance of the expected final location.

In example embodiments, the starting expected location is within a betting zone, and the expected final location is representative of a gaming token container.

In example embodiments, the gaming object is a gaming token container lid, and the infraction threshold is based on the model representation including indications of tampering.

In another aspect a system for monitoring gaming activities is disclosed, the system comprising a plurality of imaging devices connected on one or more display systems having a plurality of fields of views, the plurality of imaging devices capturing imaging data of at least one gaming participant and at least one gaming surface and at least one processor, in communication with the at least one computer memory and the plurality of imaging devices. The processor is configured to calibrate the plurality of imaging devices to a model representation of the gaming space to extract features independent of the field of view, and receive the imaging data from the plurality of imaging devices. The processor processes the received frame data by extracting one or more features of the at least one gaming participant, updating the model representation with the feature of the at least one gaming participant, and determining whether an infraction threshold is satisfied based on the updated model representation.

In example embodiments, the processor is further configured to generate time synchronization data, transmit time synchronization data to the plurality of imaging devices. Updating the model representation comprises in some cases includes incorporating a data entry associated with the extracted one or more features with a timing metadata associated with the respective imaging stream.

In example embodiments, the processor is further configured to receive synchronization data, compare the received synchronization data to a respective timing metadata of the imaging stream having the extracted one or more features in the received imaging data and, in response to determining the received synchronization data and the respective timing metadata match, updating the model representation with the extracted one or more features.

In example embodiments, the processor is configured to extract one or more field of view feature identifiers, determine an expected layout based on the extracted one or more field of view feature identifiers. The processor calibrating the plurality of imaging devices to a model representation of the gaming space to extract features independent of the field of view includes calibrating the plurality of to a respective position in the model representation based on the respective expected layout.

In example embodiments, the one or more field of view feature identifiers are quick response codes, and the expected layouts are blackjack gaming equipment configurations.

In example embodiments, the extracted features are skeletal features of gaming participants, and the plurality of imaging devices includes a first imaging device a first distance from a betting zone, and a second imaging device a second distance from the betting zone, and updating the model representation with the feature of the at least one gaming participant further includes determining whether the first distance is greater than the second distance. In response to determining the second distance is greater than the first distance, the processor assigns a lower probative value to the detected skeletal feature in the second imaging device imaging data compared to the detected skeletal feature in the first imaging device imaging data and updates the model representation based on the probative value.

Corresponding systems, method, and non-transitory computer readable media are contemplated.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 6A, 6B, and 6C are perspective views of an example display mounted system for tracking gaming activity, according to some embodiments.

DETAILED DESCRIPTION

Figure 1:
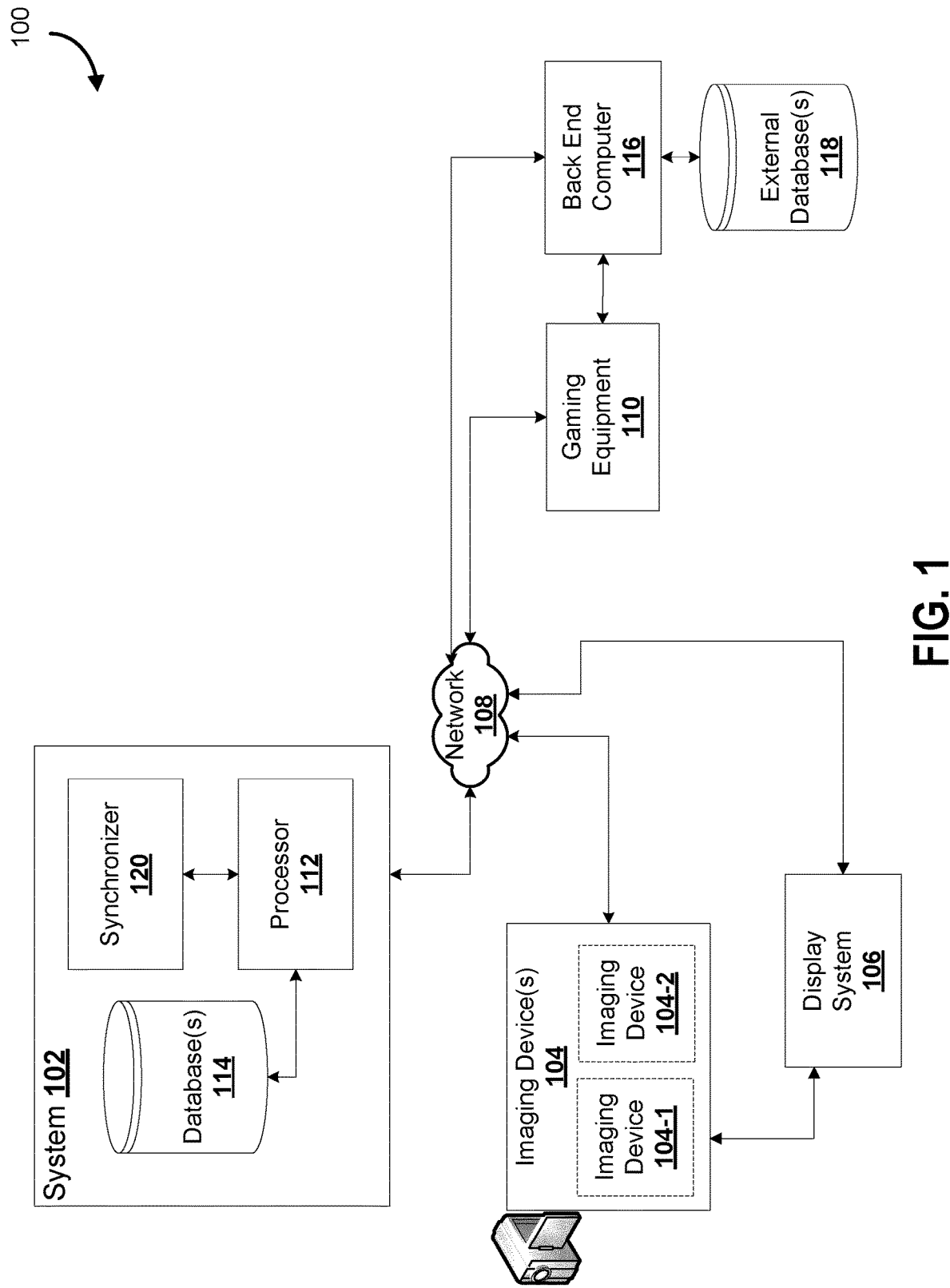
FIG. 1 is a block schematic diagram of an example system for tracking gaming activity.

Described in some embodiments below is an improved camera system that has been adapted for visually tracking gaming activities, including, for example, activities taken by players as well as the movements of physical gaming objects (e.g., playing cards, dominoes, position markers, pallets), and physical betting markers (e.g., chips, value markers, gaming plaques). Visually tracking gaming activities using computer systems and image recognition can be difficult due to physical obstructions in fields of view (e.g., for cameras positioned statically), and further, recording equipment inconsistencies and optical distortion.

The improved camera system described herein is configured such that multiple camera systems are able to operate in tandem or in concert such that the computer systems are able to utilize overlapping and non-overlapping fields of view of corresponding cameras to physically orient and locate physical objects in respect of a common spatial model having a common spatial coordinate space. The display screen itself of a device can be an obstruction that creates a blind spot, and the other proximate camera devices may be positioned such that the blind spot is covered through the fields of views of the other camera devices.

The camera systems can include homogenous systems, such as cameras mounted on to, coupled directly into, or proximate to digital signage (e.g., limit signs on each gaming table), or heterogeneous systems, such as a diversity of different types of cameras operating in tandem, such as a limit sign camera operating in conjunction with a dealer tray camera or a betting area camera.

Transformations into a common coordinate space and/or a common color space is important as the cameras observe physical objects from a diversity of angles as well as lighting (e.g., shadows, external illumination, controllable illumination), and distortion (e.g., fish-eye lens, macro lenses, varying focal length lenses) conditions. Furthermore, there may be differences in shutter speeds, color spaces, aperture sizes, noise levels (e.g., ISO levels) even among homogenous camera equipment.

A technical challenge associated with systems and methods for tracking gaming activities includes achieving accurate tracking of gaming activities while including modular or movable imaging devices within the system. Typically, tracking systems are configured for a specific imaging device geometry and calibrations are based on an expected location of an imaging device. Including movable imaging devices, or modular systems which allow for the relocation of, or the removal of existing imaging devices, may decrease the accuracy of the previously calibrated gaming system. This is especially prevalent in gaming facilities, where gaming tables are rearranged periodically to change an ambience or a capacity of the gaming facility, and thus the cameras are unlikely to be in a static position for a prolonged period of time. However, given the number of tables and cameras, manual calibration quickly becomes impractical and infeasible. Cameras themselves may also have optical characteristics that may be adjusted periodically, such as focal length, field of view, color spaces, aperture sizes, etc., based on lighting levels, a change in game type for the gaming surface (e.g., a table used for blackjack is now repurposed for no limit Texas Hold'em), among others.

Moreover, another technical challenge may include imaging device calibration being mutually interdependent. In some tracking systems, calibration of one imaging device is dependent on the calibration of a second imaging device. Therefore removing an imaging device, or altering the geometry of the imaging device may subsequently misalign other imaging devices within system, deteriorating accuracy. Improved approaches to calibration are described in some embodiments herein. The proposed approaches to calibration are adapted to utilize reference visual objects having known geometric characteristics, such as vertices, shapes (e.g., grid patterns), dimensions (e.g., A4 paper, 8.5"×11" paper), and/or color profiles (e.g., "Brilliant White"), to establish common coordinate systems and corresponding required transforms (e.g., stored as transformation matrices in computer memory) that can be utilized to effectively translate objects tracked in camera image data into physical object representations in a spatial representation (e.g., Euclidean space, or in other types of 3-D spaces, such as spaces based on cylindrical or spherical coordinates). Calibration events can occur periodically or dynamically as camera characteristics are changed, lighting conditions are detected to have changed, camera locations have changed, or periodically, and calibration can be conducted for cameras that have an overlapping view of a reference calibration object. In some embodiments, despite not having an overlapping view of the reference calibration object, calibration events can still occur, but a level of accuracy may be reduced.

Another technical challenge associated with systems and methods for tracking gaming activity include achieving a desired accuracy from a limited available set of fields of view.

Gaming patrons may resent numerous imaging devices being present at the gaming surface and try to obstruct or otherwise visually occlude the imaging devices, and therefore the despite having an amount of data from distinct points of view, the patrons may attempt to limit the amount of information available, thereby limiting the accuracy of the tracking system. For certain table games, such as Craps or Baccarat, there may also be a high level of movement activity by regular patrons around the table, making it more difficult to obtain an unobstructed view of the gaming surface by any one camera (or monitoring individuals, such as a pit boss) at a particular time.

Malicious users may even attempt to deliberately sabotage the ability of dealers or other employees from observing events, for example, deliberately obstructing viewing angles, or using electronic or optical countermeasures, such as devices intentionally designed to oversaturate cameras (e.g., an infrared emitter mounted in sunglasses, hats).

The system described herein in some embodiments is adapted to provide a level of redundancy in camera coverage through cameras working together in concert such that it becomes increasingly difficult for the malicious users to disable or impede all of the potential cameras that are able to observe the activities taking place in respect of visible physical objects within the field of view of each camera, even if it is not the specific field of view of interest for that particular camera. The accumulated geospatial information can also be utilized for improved analytics or to provide an instant replay type system to show particular movements in accordance with recorded events to aid in resolving a dispute. For example, if the patron can show that while there technically was an infraction when the bet was placed, the patron may be able to indicate that the patron was already in a motion to place the bet (e.g., already had wallet out, reached for money), and that the infraction should be excused in the spirit of ensuring smooth gameplay.

A technical challenge associated with systems and methods to track gaming activity which use wide angle imaging devices includes the difficulty in calibrating wide angle imaging devices to integrate with a nearby field of view of other imaging devices, as the edges of the field of view of the wide angle imaging device may include larger amounts of distortion. Each of the cameras will also be positioned differently and have different optical characteristics and environments, as well as different perspectives.

Some technical challenges associated with systems and methods for tracking gaming activity which include multiple imaging devices include the synchronization of the multiple imaging devices. For example, where machine learning methods are used to process the sequential data, and the imaging data from separate imaging devices can be received out of order, or having a delay, and a sequential relationship modeller within the machine learning model may detect false positives. Alternatively, the machine learning model may experience a general decrease in accuracy.

System and methods for tracking gaming activity are disclosed herein, and include one or more imaging devices in communication with one or more processors, the one or more processors configured to process captured image data to extract features and generate a model representation of the gaming space. By associating extracted features with the model representation, as opposed to an imaging device location, the system disclosed herein may be able to avoid accuracy deterioration as a result of the new camera location as features may be viewed independent of camera location.

In a specific embodiment, the system is provided as an improved digital limit sign that, in addition to providing digital signage, such as providing a screen in which players are able to observe table rules, characteristics (e.g., table minimum and maximums, gaming house rules, type of game), an automated camera system can be provided that is calibrated across other camera systems to provide improved automated gaming activity tracking, improving, for example, security of gaming events and enhancing fair play by providing automatically providing machine-vision assisted approaches to identifying player infractions, malicious play, and reconciling the occurrence of betting and game events.

Moreover, system disclosed herein may further include determining a calibration parameter for each of the one or more imaging devices within the system, based on a reference object associated with a gaming surface being tracked, and update or generate the model representation based on the calibration parameters. In this way, the system disclosed herein generates model representations which are independent of an imaging device type, location and orientation. Integrating new types of imaging devices may include determining new parameters for the individual imaging device, and not the whole system. In this way, the problem of mutually interdependent imaging device alignment may be avoided. Calibration, for example, can include using calibration surfaces, such as a grid or a sheet of paper having known physical characteristics, conducting vertex detection and/or color detection, and utilizing these known physical characteristics to establish calibration transform matrices, which can then be stored and utilized as reference models as needed. Multiple reference points can be utilized to provide redundancy in the event of non-uniform distortion effects from the camera. Calibration parameters stored in such a manner may need to be periodically updated as, for example, optical characteristics change or when the camera devices are simply moved from location to location (e.g., table rearrangement). Calibration can also include infrared references, for example, if a device is paired with a infrared betting area tracking unit, it can self-calibrate using distance infrared calibration points. The betting area tracking unit can include a module with infrared emitters that are emitted to a known distance or a pattern, and that can be utilized for calibration by other cameras that are able to observe the calibration area or pattern.

As tables are moved around, the devices can also include infrared emitters to establish zones or regions of coverage indicating, for example, the regions in which the sign can cover with sufficient density. Accordingly, in some embodiments, the devices themselves have self-calibration tools built in that can aid in improving or automating deployment speed and setup.

The systems and methods disclosed herein may also include an infrared imaging device, incorporating features detected in the infrared spectrum with other representations of the features from other imaging devices. Incorporating the features detected in the infrared spectrum may include classifying the infrared features based on an expected location, and a degree of similarity with other imaging device feature detections. By incorporating the feature detected in the infrared spectrum into the detection of whether an infraction has occurred, the system may be able to gain a new effective field of view, without having a substantially different physical orientation. For example, a heart rate feature detected by an infrared imaging device may not be apparent to a nearby RGB imaging device, and may allow the system to determine whether, for example, safety thresholds are breached indicative of the gaming participant having a serious medical condition. In this way, the systems and methods disclosed herein may allow for generating data from a new field of view without the use of a new physical orientation.

Another technical challenge includes tracking gaming activity without the use of geometric sensors while maintaining accuracy.

FIG. 1 is a block schematic diagram 100 of an example system for tracking gaming activity, according to some embodiments.

The diagram 100 shows a system 102 connected to imaging device(s) 104 via a network 106 for receiving video data having frame data (e.g., images) captured by the imaging device(s) 104. Alternatively video data captured by the imaging devices 104 may be referred to herein as frame data, additional frame data, infrared frame data, and so forth. The system 102 can be internal or external to a computing unit, and can, for example, be mounted under a gaming surface (e.g., a gaming table), mounted inside screen hardware, among others. The system 102 is configured to be coupled to a gaming backend system 116, which can coordinate image feeds from a diversity of different cameras and camera systems, such as a bet area camera, a dealer tray camera, among others.

Multiple units of system 102 can operate in tandem such that overlapping visual areas may be recorded by the different units of system 102 for improved accuracy or to avoid obstructions. In some embodiments, as different units of system 102 have different visual areas and acuity in respect of different physical objects (e.g., objects nearer a particular camera may have a higher amount of observable pixels), confidence scores and object scores can be weighted towards the cameras having a higher amount of observable pixels, in the event that there is a discrepancy in determinations from different units of system 102 that are operating in tandem.

Imaging device(s) 104 may include one or more imaging devices. For example, imaging device(s) 104 may include a plurality of imaging devices attached to a plurality of gaming surfaces (e.g., blackjack tables).

Imaging device(s) 104 can be a variety of imaging device types capable of generating video data or video data sets. In one non-limiting example variant, the imaging device 104 is an RGB camera. In another non-limiting example variant, the imaging device is an infrared camera.

In example embodiments, the imaging devices 104 are wide-angle cameras or 360° field of view cameras. According to some embodiments, for example, the imaging devices 104 include at least one imaging device which includes two cameras having a 180° field of view arranged back to back fashion, providing a 360° field of view. The camera can have, for example, two feeds from each camera to provide a 360° field of view, it may have two optics, four optics, offset lenses (vertical or side to side), among others.

Wide dynamic range imaging devices 104 may be particularly helpful at increasing image and color quality in a casino environment. The processor 112 may be configured based on the camera response function (CRF) of the imaging device 104, which measures image/frame irradiance at the image/frame plane to the measured intensity values. Various applications like color constancy, photometric stereo, and shape from shading, require object radiance rather than image/frame intensity are contemplated.

In one example embodiment, the approach set out in the Debevec and/or Robertson approaches are used to generate and display HDR image from an exposure sequence, and exposure fusion (Mertens [1] produces la ow dynamic range image and thus does not need the exposure times data.

The imaging device(s) 104 may include various combinations of imaging devices of a variety of different imaging device types. For example, the imaging devices 104 may include a first imaging device 104-1, which is a red, green, blue (RGB) camera and a second imaging device 104-2 which is a further RGB camera. In some embodiments, the imaging device(s) 104 may include a first imaging device 104-1, which is an RGB camera and a second imaging device 104-2 which is an infrared camera.

One or more of the imaging devices 104 are mounted onto one or more display systems 106. The one or more display systems may include one or more of the imaging devices 104 mounted on various locations of the display system.

The system for tracking gaming activity further includes gaming equipment 108. In example embodiments, the gaming equipment 108 includes an attachment member to which the display system attaches (such as casino gaming table surface). The gaming equipment 108 can be any equipment that allows the user to interact with and conduct games activities (such as a slot machine), or equipment that facilitates the playing of games activities (such as a blackjack table).

Figure 2:
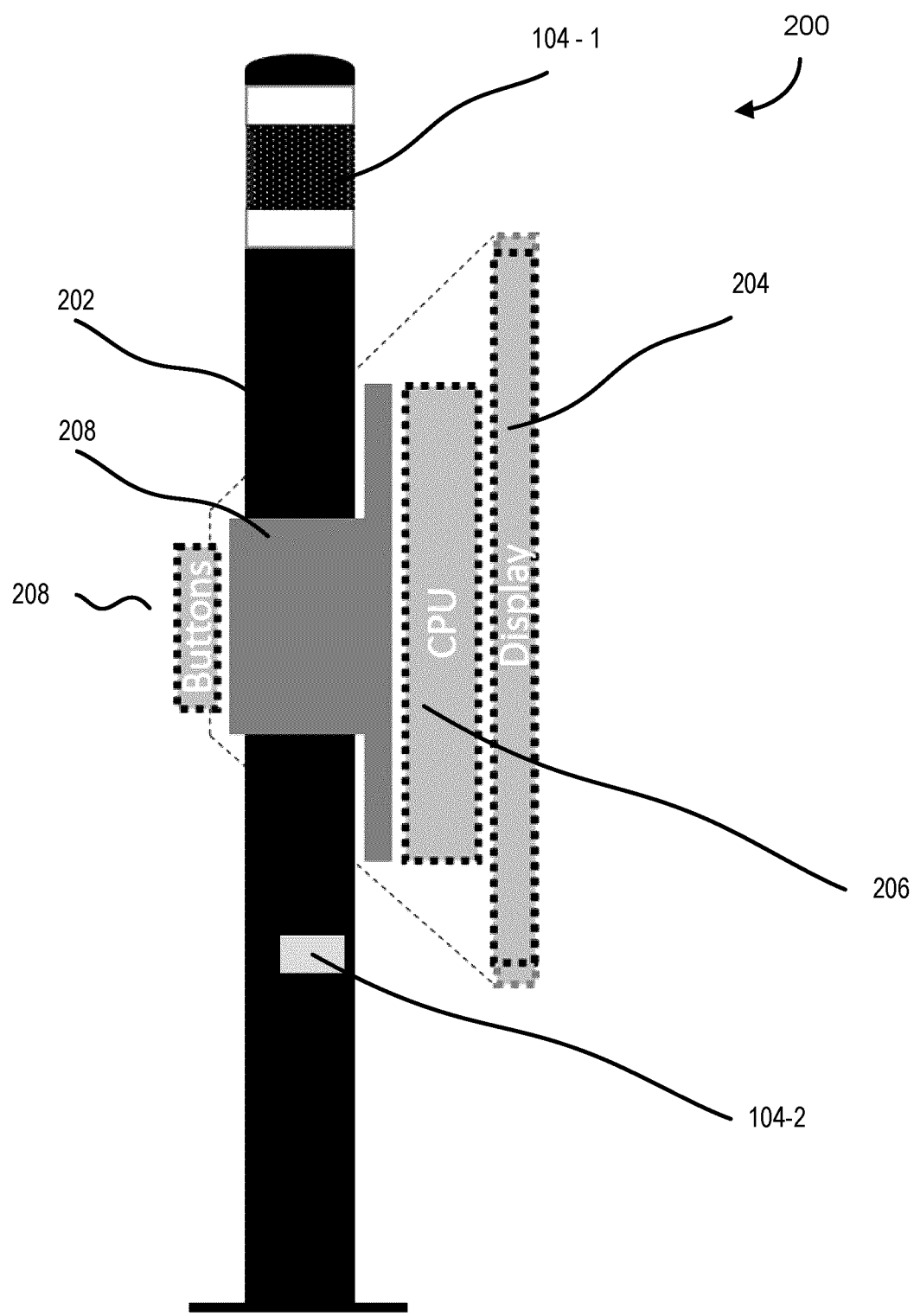
FIG. 2 is a side view of an example system for tracking gaming activity, according to some embodiments.

Referring now to FIG. 2, a side view of a system for tracking gaming activity 200 is shown, according to example embodiments, is shown. The system can be, for example, a standalone product that can provide incentives to guests to increase their length of play at a gaming table, by providing players with the ability to watch live or recorded events, ads for local business, etc.

The system, of some embodiments, is a physical, network enabled table limit sign with machine learning enhanced omnidirectional optics for control and view of table games (as described in some cases below, proximate tables as well), increasing security and providing more data on gaming activities, and providing an automated mechanism to track gesture movements (e.g., automatically track infractions to ensure fair play by reducing a propensity for late betting the after betting round has completed) to enhance the playing experience. As the system is automated, reliability is an important consideration as the system may need to be operable for as much uptime as possible without human intervention or maintenance (e.g., 24/7 operation for a lifespan of 3 years, at a normal operating temperature).

In the shown embodiment, the system 200 includes a mounting member 202, with imaging device 104-1 mounted on a top surface of the mounting member 202, and the imaging device 104-2 mounted on a second surface of the mounting member 202. Various combinations of imaging devices and mounting locations on the mounting member 202 are contemplated. For example, the third imaging device (not shown) may be mounted on a surface opposite the second surface of the mounting member 202. Mounting member 202 provides a central support for a housing that includes a display 204, and in a physical implementation, may include a 1.5" tube having a mount plate with screw holes for mounting with a mounting cover (e.g., plastic or magnetic). A camera housing may be provided for example, at the top of the member 202 at 104-1.

The system may be moved from table to table, and in some embodiments, the location may also change between configurations of a single table (e.g., the limit sign for Blackjack may be on the right hand side, while for consistency for Baccarat, may be on the left hand side). In some embodiments, the physical configuration and location of the sign is moved deliberately to provide overlapping coverage of gaming surfaces between multiple tables (e.g., four tables in a square configuration in close proximity may have systems mounted at the near corners of each so that the limit sign cameras are able to cover portions or all of the other tables. The overlapping coverage is useful in situations where redundancy is needed in view of the presence of foreign objects or obstructions, or where accuracy may need to be enhanced due to prevailing environmental conditions (e.g., haze/smoke in the air, shadows, over/undersaturation from external light sources), etc.

Components may be mounted on the mounting member 202 by a variety of means. For example, the display 204 can be mounted on the mounting member 202 via an attachment member 208. In some embodiments, the display 204 is mounted to the mounting member 202 using a male and female connection, or a VESA™ mount, or the like. The mounting member 202 may be coupled with power (e.g., 120 V NEMA North American plug), which may be coupled to a power supply or a power distribution unit adapted to support the screen, hub, accessories, network cards, computer processors, among others. In some embodiments, the system has a built in processor and on-board memory, and in other embodiments, the system includes a separate control processor or device that, for example, can be mounted under the table. Power can be provided, for example, through power cables attached to an internal power board, a power USB 3 hub, and data connections can be provided through HDMI and/or motherboard GPIO connections.

The display 204 can further include buttons such as physical or virtual buttons, and/or LED indicators (e.g., RGB LEDs). The display 204 can be used, for example, to provide indicator colors indicating that a table is open, closed, an infraction has likely occurred, a count error has occurred (e.g., ratio of cards in vs. cards destroyed has deviated from 1:1), an abnormal condition has occurred (e.g., too many foreign obstructions on gaming surfaces and the ability of the system to monitor activities has become impeded, or abnormal visual artifacts on the playing cards has been noted), among others.

According to example embodiments, the system 200 is modular, and components can be interchanged, removed or added to the system. For example, various imaging devices 104 may be removably connected to mounting members 202, and connected to the processor 206. The processor 206 can include, for example, a Raspberry Pi 4™, or a Newmaytech Mini PC™, among others. An even more capable processor 206 may be utilized where there are computationally strenuous requirements being processed at the local level before sending of processed information to the backend monitoring server.

The processor 206 may be connected to a network interface adapter, which, for example, communicates with a gaming monitoring server backend that tracks multiple tables and interconnects different systems, such that the different camera systems are able to interoperate with one another. As described in various embodiments herein, a common coordinate system may need to be established for conducting transforms such that image data can be first transformed and processed to map to a common coordinate space (e.g., a common 3D model in Euclidean space), and calibration approaches are described for such an event.

The network interface adapter, in some embodiments, allows for more than one camera to operate in concert and to "stitch together" a model of the gaming area or surface based on the images captured from their corresponding fields of view.

The gaming monitoring server backend may provide a user interface (e.g., on a web interface or a web application under a LimitVue™ tab where raw or processed event data can be tracked for differing periods of time, by individual table, by pit group, by random groups, by targeted groups (e.g., high volume tables, tables flagged for a high volume of suspicious transactions, tables whose payouts did not reconcile properly), and the user interface can be utilized also as a mechanism for notifications to gaming facility employees or managers indicating various table statuses that have been estimated by the system (e.g., closed, open, security, wait staff/attendant needed, medical, among others). In some embodiments, the user interface is also configured to generate visual outputs such as bar graphs, line charts, indicating why the system has estimated a certain state to have occurred (e.g., bar graphs showing logit probabilities, indicating which camera system contributed most to an accuracy reading that an individual has made a late bet or the count does not add up).

Where there is an event, for example, a review can be automatically generated based on saved recordings (e.g., 30 s before and after event), tracked dealer ID and table ID, tracked player ID and player spot #, targeted event playback, among others. The review can be augmented with the probabilities estimated by the device during specific timestamps or events—e.g., a red status when the skeletal representation of the user's hands entered the betting area proximity geofence 1 second after the betting closed timestamp event, and the number of observed betting markers (e.g., chips) in the corresponding betting area increased or decreased.

The review can be tracked and annotated such that an "instant replay" feature is provided based on the maintained representations of movement of individuals, betting markers, or gaming tokens. Recordings may be generated and maintained whenever an infraction signal is generated, and the system may be configured to record and store event data that occurred for a period of time before and after the infraction signal was generated. The recordings, in some embodiments, are annotated with probability values or logits from the machine learning engine, and the annotations can include overlaid numbers, colors, among others, or indication of which body appendage yielded the infraction, etc.

In some embodiments, the estimation of activities and states is conducted locally on the processor of the system, and in other embodiments, the estimation of activities and states is conducted remotely on the gaming monitoring server backend processors. The benefits of local processing is that it can reduce the overall bandwidth required for transmission to the gaming monitoring server backend as data can be compressed and rectified prior to transmission.

The drawback of local processing is that the processors locally available can have limited processing power, speed, and memory, due to volume, cost, and heat constraints. In some embodiments, a mix of pre-processing and post-processing is conducted.

These tools can be useful for security staff to help enforce and ensure fair play while providing flexibility to the gaming facility to dynamically relocate, reconfigure, and reposition the devices while having reduced manual requirements for calibration, custom configuration every time the cameras are moved or relocated, as in described in some embodiments, the calibration can automatically occur and the re-calibration and re-generation of the common coordinate system transforms can occur. Movement can be tracked using a gyroscope or accelerometer or a beacon/GPS positioning unit, and automatically trigger re-calibration. In some embodiments, re-calibration can also be triggered when there are a number of abnormal or inconsistent readings relative to other devices that have not been moved. For example, if four devices are operating in proximity to one another, and the readings are consistent, and then one of the devices suddenly has positioning data that appears to be out of sync/alignment with the others, it is possible that that one device was bumped/pushed/moved, for example, by a player accidentally or a dealer, and that one device can automatically trigger a re-calibration event to ensure that it is able to map to the same coordinate space as the other devices.

The display 204 can be mounted on the mounting member 202 to face a gaming participant. Display 204 may be an interactive display allowing the gaming participant to interact with, and provide instructions to, the display 204.

To this end, the display 204 may be connected to a processor 206. The processor 206 may be configured to interpret gaming participant interaction with the interactive display 204. In response to receiving gaming participant input, processor 206 may control the display 204 to render a new interface. According to some embodiments, for example, the processor 206 is configured to transmit information received from the interactive display 204 to an external processor (not shown).

The processor 206 can be connected to the imaging devices 104-1 and 104-2 to receive captured video data or frame data. The imaging devices can include high-resolution cameras having different types of optical characteristics (which may also change over time), and can be used for card detection, token detection (e.g., chip, plaque), human body portion detection/gesture detection (e.g., maintaining skeletal representations). In a specific embodiment, the imaging devices are a 360 degree camera that is omnidirectional, and this can be achieved through the use of two coupled 180 degree cameras, or a camera that can be configured to pivot to view different positions. In some embodiments, instead of the camera pivoting, the camera housing pivots instead.

The processor can be configured, for example, to track physical objects proximate to or on the gaming surface, and movements thereof, for example, betting markers (e.g., chips, plaques), gaming tokens (e.g., playing cards). For gaming tokens, for example, the processor is configured to track, using a machine learning model or pattern recognition engine, characteristics of the cards, such as card values (e.g., Ace, 1, 2, 3), suits (e.g., clubs), different variants, design patterns, visual artifacts/defects, wear levels (e.g., bent corners, not even to gaming surface), among others. While a regular level of wear is likely, especially in gaming institutions that re-use cards for a certain duration of time, abnormal wear amounts can be tracked or abnormal damage can be tracked to raise an infraction alert.

For certain games, cards having equivalent value for the game, such as face cards and 10s in Blackjack (all have the value of 10), can be ultimately be rectified as a same type of object such that bandwidth requirements are reduced. However, as these cards are often the targets for alterations and modifications, the machine learning engines can be tuned to apply more computing resources to track abnormal wear patterns for all face cards and 10s, for example, such that these card types are especially targeted for pattern recognition. Similarly, suits can be accordingly removed for games where suits are irrelevant towards gaming outcomes.

The cameras may be configured to track and count the number of cards being consumed/used/played in a session, or track, against skeletal representations, whether a particular card has been touched or held by a player for a particular time. In some embodiments, cards can be designated for destruction or removal from the game, and new cards can be introduced, and the processor or the backend gaming monitoring server can be configured to keep, in incremental counter values in computer memory, a number of cards destroyed and new to ensure that a 1:1 ratio is always maintained, otherwise an infraction alert is issued.

In some embodiments, the processor 206 processes the received captured video data as described herein. Alternatively, the processor 206, in response to receiving video data from the imaging devices 104-1 and 104-2, sends the received video data to an external processor (not shown). In some embodiments, the processor 206 may process some portion of the video data to track gaming activities and send an external processor some combination of the tracked gaming activity and the captured video data. The imaging devices may be provided at a height from the table (e.g., 400 mm-600 mm) so that a close but overhead perspective view can be obtained at a working distance of 600-1500 mm. The imaging devices, for example, can include a first high resolution camera having a depth of field with a large field of view (~1000 mm to center of target), and can track objects, for example, between 300 mm-650 mm, having a resolution of >=3 pixels per mm at 1500 mm, and a focal length of 7.9 mm (for example). A second 360 degree camera can be provided, for example, having a 1080 p resolution/sensor, having a small profile, etc. In some embodiments, custom cameras are utilized that are adapted for further onboard processing improvements.

According to some embodiments, the processor 206 performs the functions of the system 102 described herein.

Figure 3:
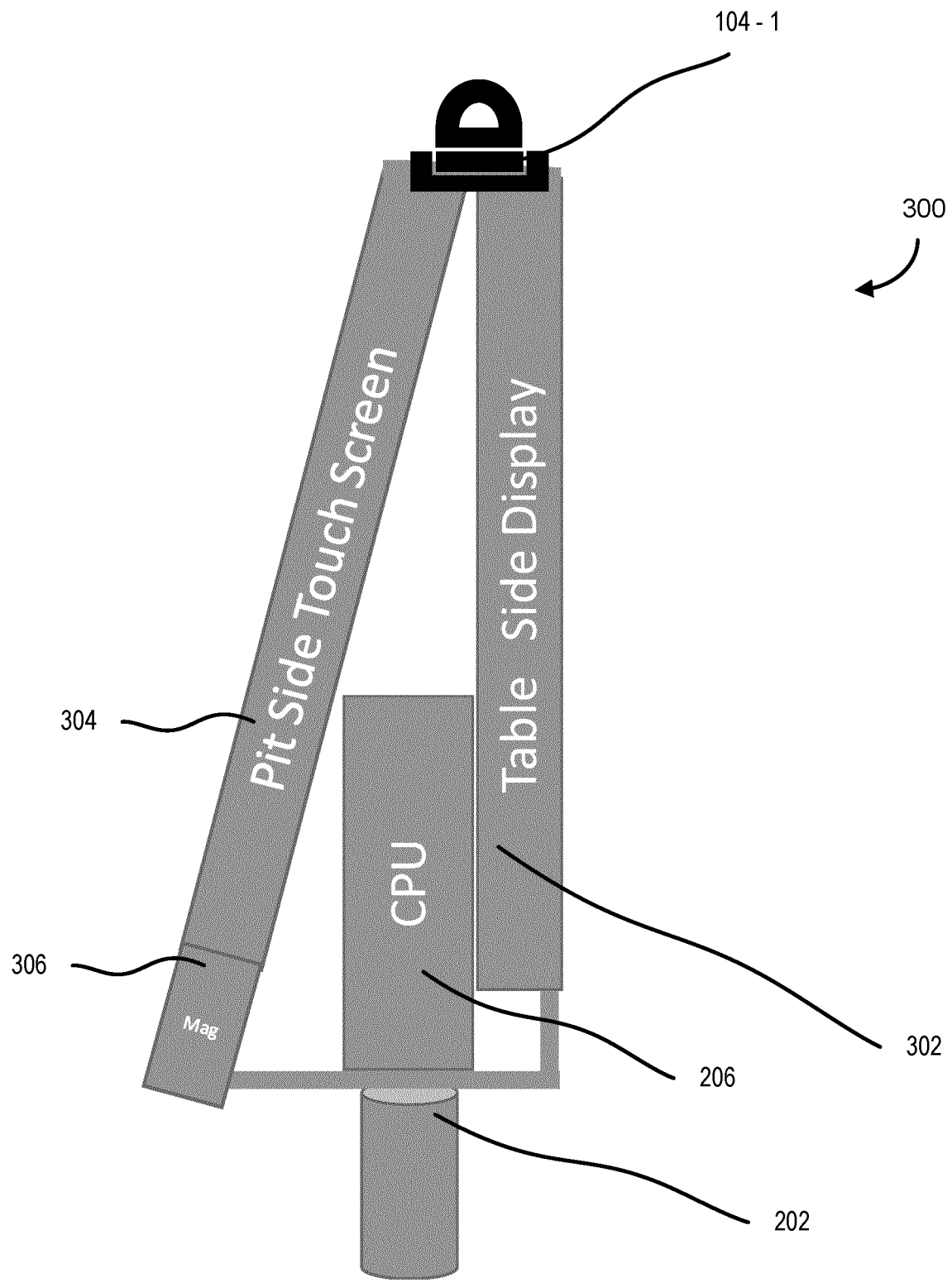
FIG. 3 is a side view of a further example system for tracking gaming activity, according to some embodiments.

Referring now to FIG. 3, a side cross-sectional view of a display mounted tracking gaming activity system 300 is shown.

In the shown embodiment, a first display 302 and a second display 304 are mounted on opposite sides of the mounting member 202. Various combinations of displays and orientations of the displays relative to the mounting member or gaming surface are contemplated.

In FIG. 3, the second display 304 is mounted to face a gaming employee gaming participant, and includes an input-output module 306. In some embodiments, the second display 304 does not have the input-output module 306. Alternatively, the system 200 may have any number of input modules 306 incorporated into a display, separately mounted on mounting member 202, or otherwise.

Figure 4:
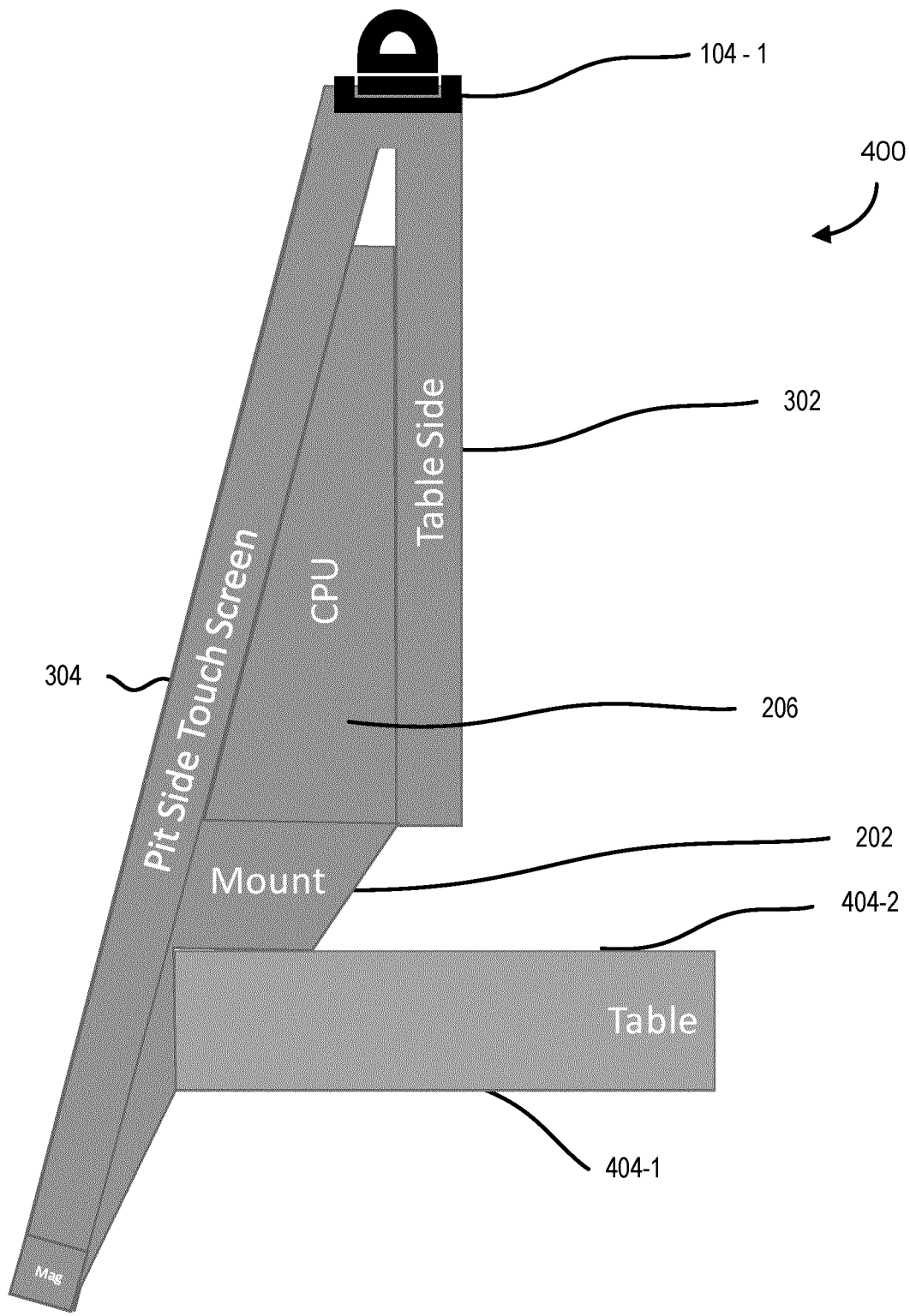
FIG. 4 is a side view of another example system for tracking gaming activity, according to some embodiments.

Referring now to FIG. 4, a side cross-sectional view of a system for tracking gaming activity 400 is shown.

In the shown embodiment, the mounting member 202 is mounted to an attachment member 404-1 (e.g., a casino gaming table) of the gaming equipment. The mounting member 202 is attached to the gaming equipment such that the imaging device 104-1 on top of the mounting member is in a first orientation relative to a gaming surface 404-2 of the gaming equipment, having a first field of view. In example embodiments, the first orientation can be represented by a focal distance between the imaging device 104 can be gaming equipment surface 404-2. Various other means of representing the first orientation are contemplated.

The mounting member 202 may be attached to the attachment member 404-1 of the gaming equipment via an attachment groove, as shown in FIG. 4. The mounting member 202 may be attached to the attachment number 404 in a variety of manners, including for example, with fasteners, glue, and so forth.

The imaging device 104 may be removably mounted to the mounting member 202. For example, the imaging device 104 may be mounted to the mounting number 202 with a clamp. In another non-limiting variant, the imaging device 104 is removably mounted to the mounting member 202 through the use of Velcro™, a male to female connector, and so forth.

Figure 5A:
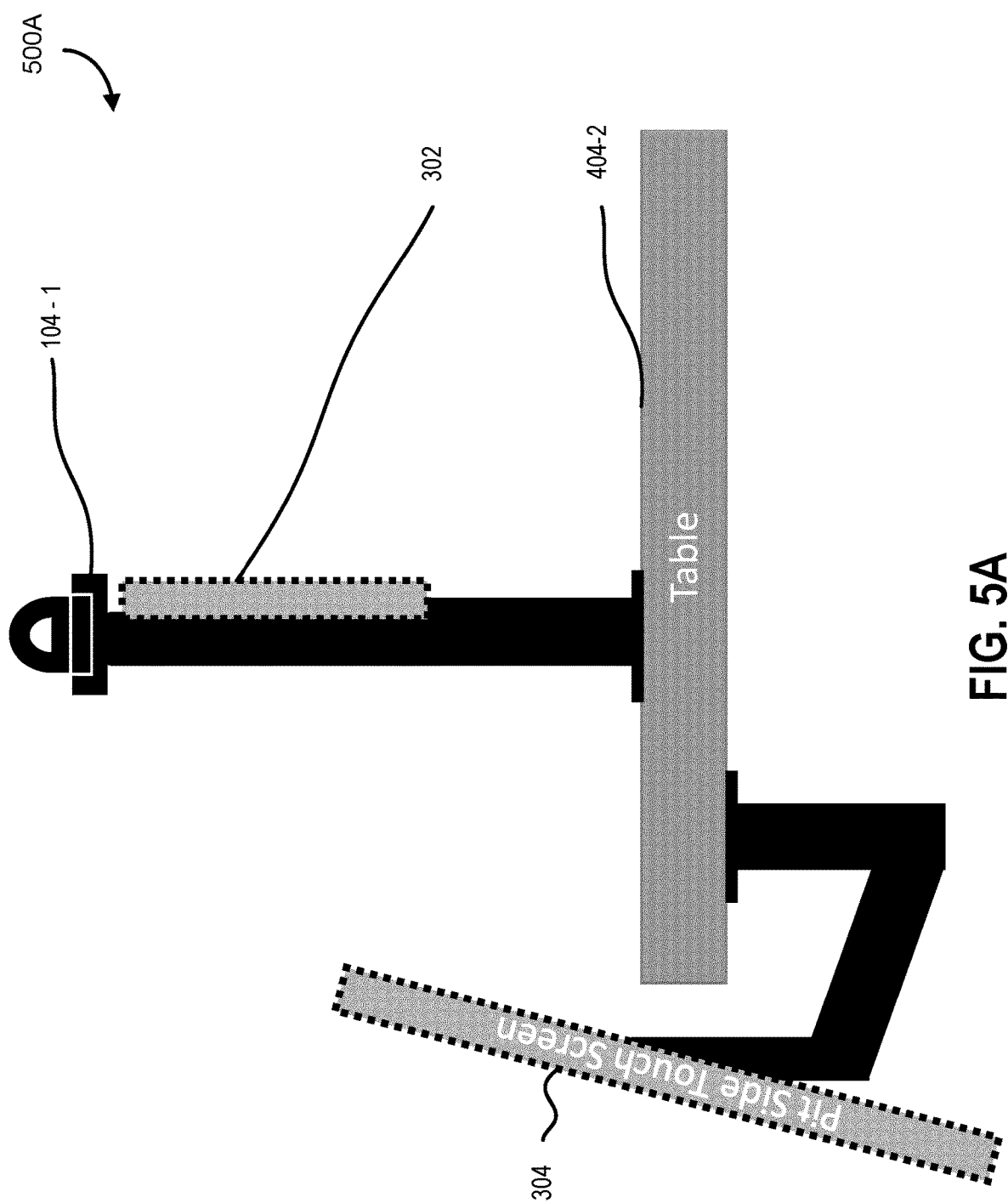
FIGS. 5A and 5B are side views of yet another example system for tracking gaming activity, according to some embodiments.

In the embodiment shown in FIG. 5A, a system 500A for tracking gaming activity includes the second display 304 mounted to face a gaming employee gaming participant in first location on the gaming surface 404-2, and the first display 302 being mounted atop the gaming surface 404-2, in a second location.

Figure 5B:
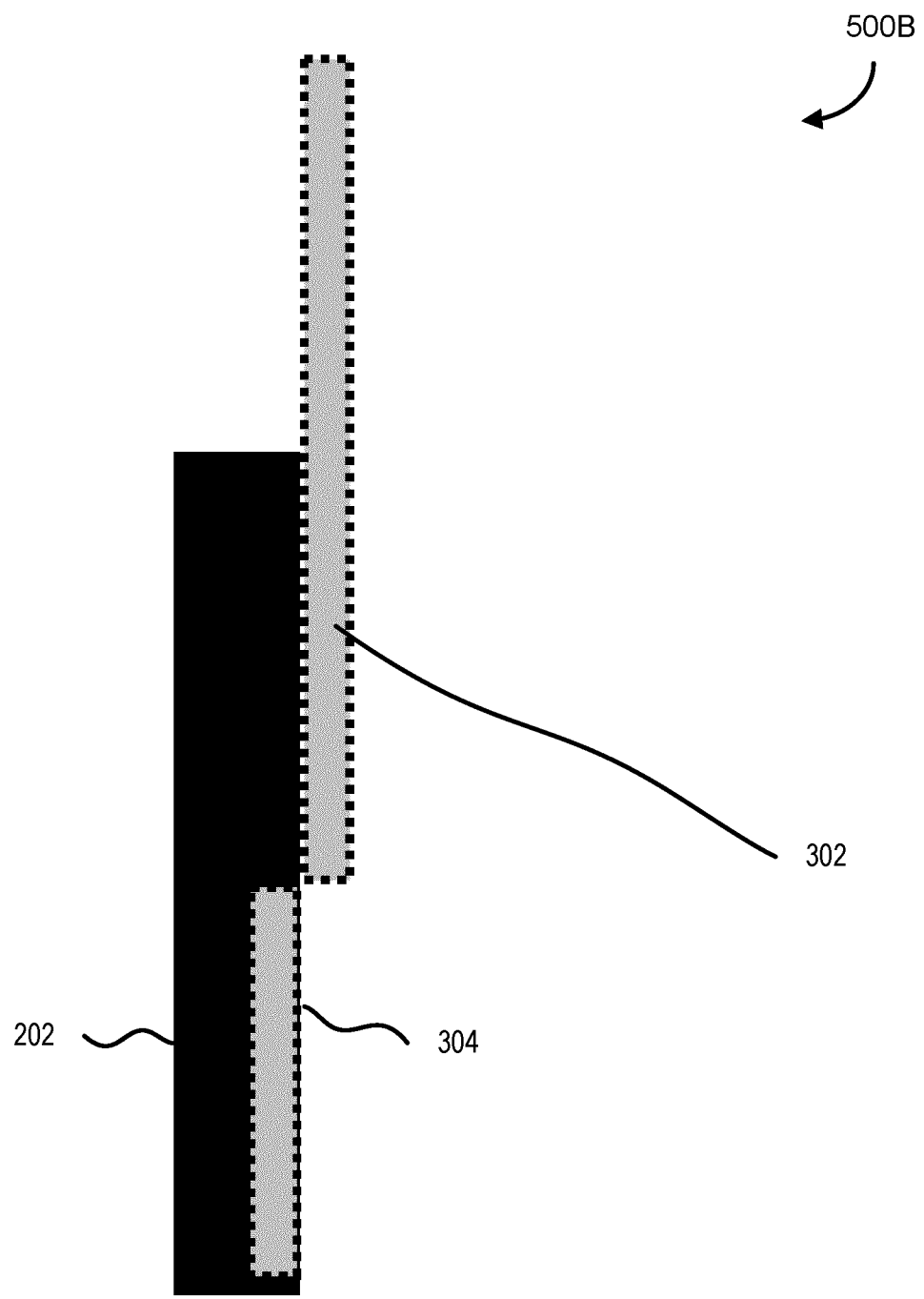

In the embodiment shown in FIG. 5B, the system 500B for tracking gaming activity includes the second display 304 mounted below the first display 302, and may be mounted to permit rotation about the mounting member 202.

FIGS. 6A to 6C are perspective views of an example display mounted system 600 for tracking gaming activity. FIG. 6A shows a rear perspective view of the system 600, and FIG. 6B shows a front perspective view of the system 600, which includes the mounting member 202, the first display 204, and the imaging device 104-1. FIG. 6C shows a front view of the imaging device 104-1 of system 100.

Referring again to FIG. 1, the system 102 includes one or more processors 112, and may include one or more databases 114 for processing or storing video data, respectively. Hereinafter, for ease of reference, the one or more processors 112 shall be referred to in the singular.

The system 102 receives the video data from the imaging devices 104, and the received video data may be associated with a unique or overlapping field of view. The unique or overlapping field of view of imaging device 104, can be based on an orientation of the imaging device 104 with respect to the gaming surface, its location in a gaming space, and so forth.

The processor 112 of the system is configured to process the received video data from the imaging devices 104 and to generate a model representation the gaming activities. In example embodiments, the model representation include a representation of one or more gaming participants represented in the received video data. The model representation can be a representation of a gaming space, which gaming space includes the gaming surface, the gaming tokens, and the gaming participants participating in the gaming activity. According to some embodiments, for example, the model representation can be a representation of a space shown in the field of view of the respective imaging devices.

The processor 112 may store the model representation in a local memory (not shown), or the processor 112 may store the model representation in the database 114. In some embodiments, the processor 112 stores a local model representation that is transmitted to an external computer 116 (alternatively referred to as the back end computer 116) which interrelates the local model representation with a global model representation.

The model representation may be a 2D model representation. For example, the model representation may track a location of the feature in the video data. According to some example embodiments, the model representation stores the extracted features and the associated pixel locations of the extracted features.

According to some embodiments, the model representation is a 3D model representation. For example, the 3D model representation may store extracted features of the gaming participants relative to their location in the field of view of the imaging device. In some embodiments, the 3D model representation stores the extracted features of gaming participants relative to a reference location (such as an x, y, z coordinate), or alternatively stated, independent of the imaging device field of view.

The model representation may further store extracted features based on a time associated with the frame data of the extracted feature. For example, the model representation may store extracted feature information (e.g., a feature type, eye feature attribution to the gaming participant, and so forth) in association with, or appended with, a time in which the extracted feature was detected.

The model representation may store extracted features from one or more imaging device video data sets in a single model representation. For example, the processor 112 may update the model representation by stitching together various extracted features from various imaging device video data or frame data.

Stitching together the stitching various extracted features may include calibrating the one or more imaging devices.

Figure 7:
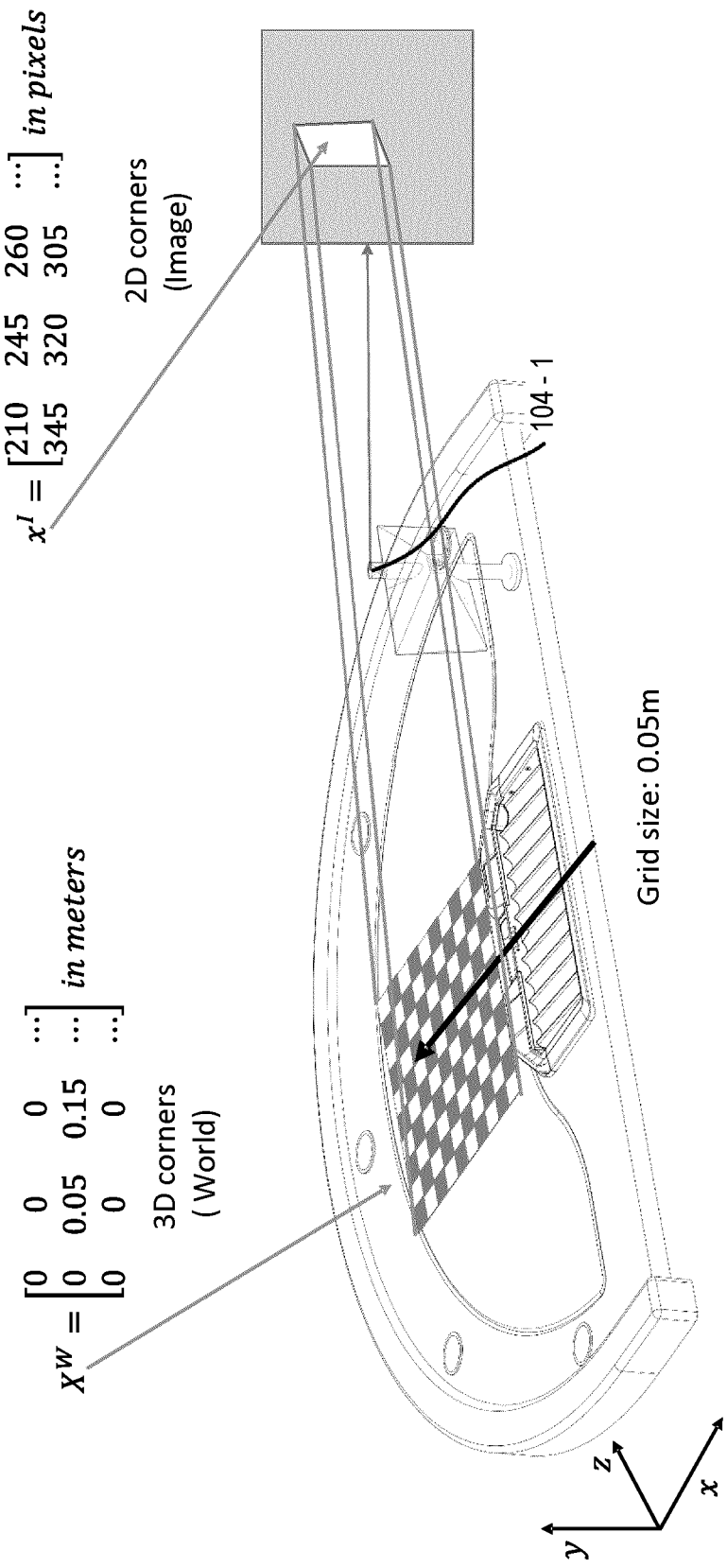
FIG. 7 is a diagram of camera calibration for catadioptric cameras, according to some embodiments.

Reference is made to FIG. 7, which is a diagram 700 of a technique for calibrating an image device 104-1 for generating frame data for a model representation. In some embodiments, the gaming table may include one or more reference objects, such as predefined surface patterns including quick response (QR) codes (as shown in FIG. 7), or a non-surface objects (e.g., a view of another table or a pillar in the background, not shown) and the system may determine a calibration parameter based on the reference objects or reference surfaces.

In some scenarios, multiple imaging devices are calibrated with a single reference object or reference surface, where the fields of view are overlapping. For example, it may be desirable to calibrate imaging devices to in reference to calibrating an imaging device with a wide field of view, as the wide field of view imaging device may be able to observe a reference object from a larger set of locations.

Where a patterned surface is used as a reference object, the location of patterned surface provides information on the position, length, width and axis angles of the imaging device viewing the patterned surface. The patterned surface does not need to be a specific size or shape, but does need to exist on the gaming surface or associated equipment. Examples of alternative calibration features, randomly generated dots, QR Codes, a picture, type set text or the layout itself.

In example embodiments, the reference object is a feature within the gaming space visible to the imaging devices. In embodiments where the imaging device is other than an RGB device, the reference object is an object visible to the non-RGB device. For example, to determine the equipment calibration parameter for infrared imaging camera, the reference object is an object capable of generating a temperature observable by the infrared imaging camera.

In some embodiments, the imaging devices may include intrinsic parameter K, including focal length, skew, and/or principal point, and extrinsic parameter P, including rotation and translation. The image capture device calibration parameter may be based on the following transformations:

$$x_k^I = KPX_k^W$$

$$x_k^I = \begin{bmatrix} f_x & s & p_x \\ 0 & f_y & p_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} X_k^W$$

The calibration may be based on provided layout information captured by the imaging device. For example, the imaging device may include metadata regarding the gaming equipment in the imaging device field of view, such as reference model data for the table being looked at, which game (e.g., blackjack) is on this table, the number of player spots, bonus bet positions, and felt styling (for color balance reference). The transformation matrix can be dynamically generated as the imaging devices have characteristics that change (e.g., changed focal length, aperture, shutter speed, changed environmental conditions (e.g., lighting changed, windows opened), etc., and can dynamically update such that the common coordinate system for calibrating and entering/updating physical object data into a model can remain consistent even though there are many camera systems operating together that are not necessarily homogenous in configuration or location. In some embodiments, the transformation matrix update is triggered by a tracked discrepancy relative to other cameras, or can be triggered automatically whenever the camera is moved or shifted in location.

There are different types of transformation matrices possible, including, for example, a perspective transform matrix, a color transform matrix, among others, and these are established based on known geometries based on calibrating device reference objects, such as static or printed checkerboard designs, QR codes, or even placed objects having known dimensions, colors, etc. Similar to the perspective transform matrix, the color transform matrix is maintained for each camera to aid in converting color values to a common color system to account for differences in color spaces between each camera and variations in ambient or environmental conditions, such as haze, smoke, etc.

Where there are more than two cameras (e.g., in a 50 camera set up), as long as there is overlap in imaging fields of view between linked pairs or groups of the cameras, a common coordinate system can be established for all of the cameras (although an error value may be present). This is particularly useful in establishing and maintaining a global representation of physical objects oriented in a spatial model, and tracking gaming events and activities as they take place within the gaming facility, as all of the tracked data objects have a common reference and timestamps such that coordinated analysis can be conducted.

For example, the system can then be utilized to account for the presence of obstructions (e.g., cameras 1, 2 obstructed, but camera 3 from limit sign has coverage), automatically adjust for changes in ambient light conditions (e.g., blinds opened, evening lights turned on), among others. This is particularly useful in automatically enforcing fair play requirements where malicious actors may be deliberately attempting to obstruct or otherwise impede the accuracy of the camera devices. Device images can be used to augment and support one another to improve accuracy and confidence of machine learning data model outputs—for example, a higher confidence can be represented in logit outputs where two or more cameras confirm that a physical object is in particular position or has particular characteristics.

If the reference object is temporary, capturing may be advantageously performed with multiple sources to get the benefit of the multi imaging views at that time. Calibrating with temporary reference objects after the fact can be computationally challenging, because the position may change.

A temporary reference object (alternatively referred to as a temporary calibration object) can also serve as a pointer to another calibration image to search for. For example, if a game layout image is referenced in the calibration objection, after the calibration object is removed, the layout of the table can serve as a fixed calibration object for the imaging device to reference. In non-limiting example embodiments, in a first step of calibration, the imaging device looks for and positions a QR Code on a gaming surface. During a second step of calibration, the QR code is processed to determine (or the QR code points to) a link indicating that the gaming equipment associated with the field of view is in a BlackJack Layout 55. During a third step, the imaging device processes captured images to determine whether there is an existing BlackJack Layout 55. During a fourth step, where the gaming equipment is in the BlackJack Layout 55, said layout serves as the reference object.

The temporary reference object surface pattern can serve as a means to orient cameras and their positions and may be easier to locate in a busy scene. The temporary reference object may be better at providing a reference to the imaging device(s) to specific area for tracking. For example, the temporary reference object surface pattern may provide approximate image coordinates for machine learning to more precisely align parallel image data points.

Where the reference object is fixed to the gaming surface (printed or etched on gaming felt or table), images for calibration can be captured at any time, including in frame data where the table is empty (no player or dealer), during play or between play.

In some embodiments, for example, if the reference object is permanently fixed to the gaming surface or nearby associated gaming equipment, the calibration process could be routinely, or continuously re-checked to keep image feeds in calibration.

In example embodiments, the imaging devices are stationary, and imaging device calibration calculations have the benefit of some known parameters, like the optics of the imaging device, and z axis offset for the gaming surface (mount to sensor height). By knowing the imaging device specification, certain optic variables are further defined and interpreting the image more accurately may be possible (very generally, pinhole vs omnidirectional).

Calibrating a 360/omnidirectional imaging device may also include calibrating the respective imaging device without reference to an image point, used in traditional imaging devices, and instead may include surface points in omnidirectional vision.

According to some embodiments, when the calibration image is read, the reference object's physical size is known upon reading or before reading, and the patternWidth and patternHeight variables are populated. Vector images of the calibration frames are stored and used to determine rotation values for each calibration image stored. A translation for each calibration image is generated, and subsequently, the system may generate distortion coefficients and an estimation of each reference object viewed by the imaging device is generated.

In calibrating multiple imaging devices, the processing includes finding overlapping regions in the multi-camera images. In some embodiments, perspective is corrected and in some cases removed. Thereafter, the combined imaging devices sources become data in one coordinated system.

Multiple images from multiple imaging devices may be used for calibration, or alternatively a single frame from a single imaging device may be used to calibrate imaging devices. Indices of images used for calibration may be stored separately from the model representation, or they may be incorporated into the model representation.

Figure 8:
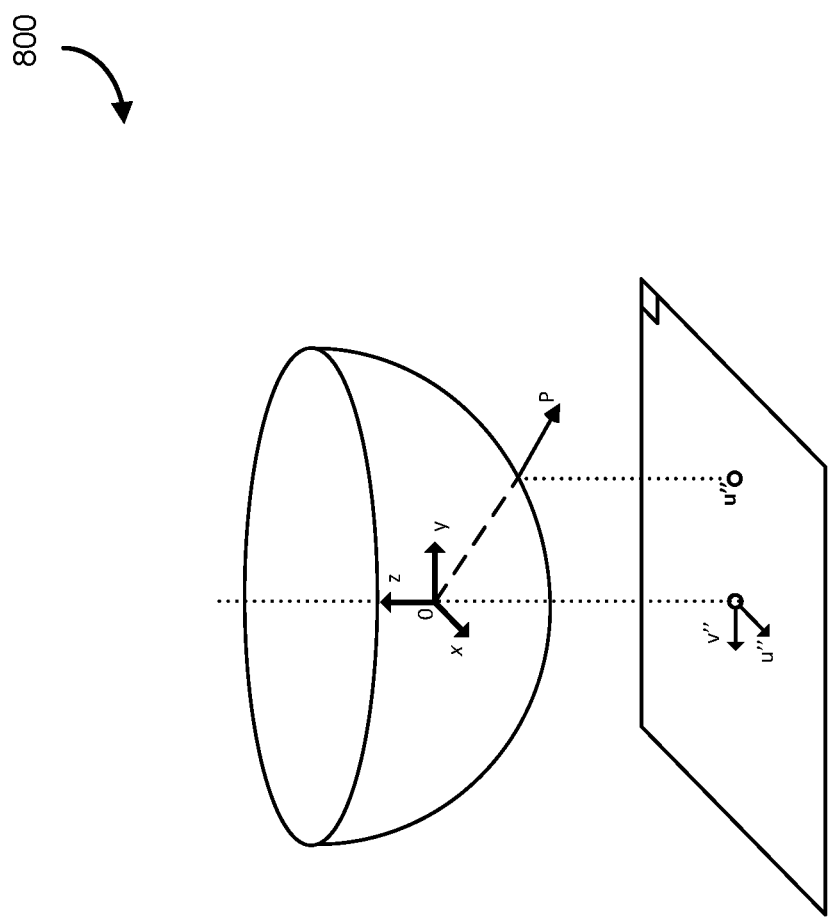
FIG. 8 is a diagram of camera calibration for dioptric cameras, according to some embodiments.

Reference is made to FIG. 8, which illustrates an omnidirectional camera model 800, in accordance with an embodiment of the present application. The omnidirectional camera may be catadioptric.

In some embodiments, the processor 112 may be configured to determine the calibration parameter for the imaging device, and subsequently augment the images captured by imaging devices to conduct 360 degree fisheye transformation. In some embodiments, the image capture device may conduct operations of equi-rectangular projection.

Figure 9:
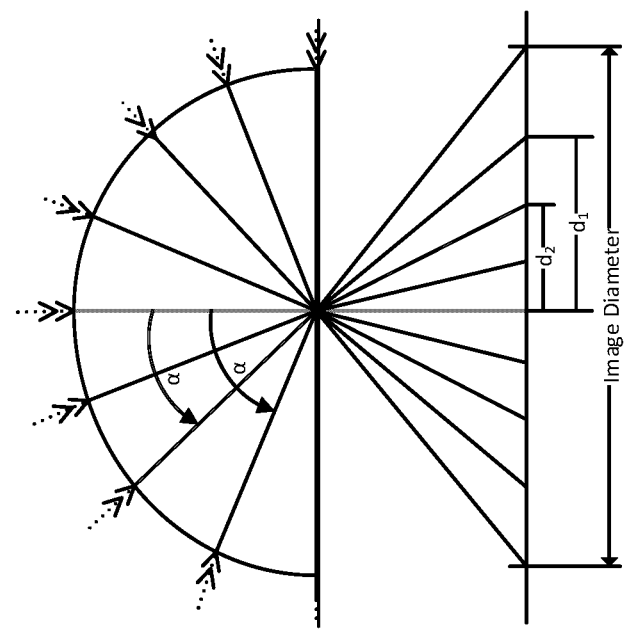
FIG. 9 is a diagram of gaming surface calibration for a system for tracking gaming activity, according to some embodiments.

Reference is made to FIG. 9, which illustrates an omnidirectional camera model 900, in accordance with another embodiment of the present application. The omnidirectional camera may be dioptric.

In some embodiments, imaging devices may be calibrated based on omnidirectional camera calibration parameters and structure based on motion. In some examples, it may not be critical whether a camera model is catadioptric or whether the camera model is ioptric. In some examples, factors such as focal length, skew, or principal point may not be critical parameters. In some examples, camera modeling may be based on Taylor series expansion:

Calibration Parameters: $\lambda x = \lambda \begin{bmatrix} u \\ v \\ f(\rho) \end{bmatrix} = [R\ t]X = PX$ Taylor expansion coefficient $a$ Rotation $R$ Translation $t$ $$f(\rho) = a_0 + a_1\rho + a_2\rho^2 + \ldots + a_N p^N$$

Alternatively stated, where the first imaging device 104-1 is associated with first point of view, and the second imaging device 104-2 is associated with a second point of view, and where both imaging devices capture video data having a reference object, the processor 112 may be configured to determine a calibration parameter based on the visible reference object to interrelate the two points of view based on the reference object.

Subsequently, the processor 112 may populate the model representation with extracted features from various imaging devices based on, or with reference to, the calibration parameter of the imaging devices. Further describing such an example embodiment, the processor 112 may detect a first feature of the gaming participant (e.g., hand) in a first frame associated with video data from a first camera, update the model representation with the user's hand x, y, z coordinates (e.g., a centroid of the hand) in the gaming space, and when the gaming participant moves the feature to a second position in the second field of view of the second camera, processor 112 may update the model representation with a second set of user coordinates x2, y2, z2, where the coordinates are part of the same coordinate system based on the location of the reference object.

Generating, populating, and updating model representations may include detecting features of gaming participants, or detecting the gaming participants themselves in the imaging device frame data via the processor 112.

According to non-limiting variants, the processor 112 processes the received video data with one or more machine learning models to detect gaming participants based on similarity scores in pixel regions of a frame within the video data. For example, the machine learning model may include one or more convolutional neural networks which aggregate features in various regions of the frame of the video data.

In some embodiments, the machine learning model may include an encoder—decoder configuration pre-trained on previous images to detect the presence of features of the gaming participants based on a vector mapping of the features in the video.

Once the processor 112 detects the gaming participant in a frame of the video data received (e.g., a first frame), the processor 112 is configured to extract a feature of the detected gaming participant. In example embodiments, the processor 112 utilizes the same machine learning models used to detect gaming participants to extract features. The processor 112 may determine the extracted feature based on processing the received video data with separate machine learning models for identifying specific features upon detection. For example, the processor 112 may implement a separate machine learning model for detecting faces upon detecting a gaming participant.

According to some embodiments, for example, the processor 112 implements machine learning models which identify and extract features independent of detecting the gaming participant. For example, the processor 112 may be configured to determine all hand features with a frame of the video data, irrespective of identifying a gaming participant.

The processor 112 may be configured to assign each feature a likelihood of belonging to a predicted gaming participant. In example embodiments, the likelihood of belonging to a predicted gaming participant is based on a distance between hand features and the relative orientation of other detected hand features. For example, hand features having an orientation and spaced shoulder width apart may be determined to belong to the same gaming participant. In example embodiments where the features are object features, such as beverages or smoking devices (e.g., vaping devices), the processor 112 may be configured to assign a likelihood based on the nearest gaming participant.

The extracted feature may be a feature indicative of a bodily appendage, such as a hand, an arm, and so forth. The feature, in some example embodiments, is a facial feature, such as a gaze (for determining active participation), a likely emotion, etc.

The extracted feature of the detected gaming participant may be a skeletal feature of the participant. For example, the extracted feature can be a skeletal structure associated with a bodily appendage, such as a hand, an arm, and so forth.

Extracting skeletal features may include skeletal calibration done with multiple cameras with varying perspectives. For example, calibration can be done by capturing image data in a sequence with one person rotating through all the player seats. Processing the sequential player frames through pose estimations and selectively averaging based on pose orientation relative to each camera can be used to calibrate the model determining skeletal features. Skeletal features can include, for example, tracking a player skeleton or skeletal representation through superimposition of a skeletal framework to provide a reference of a player positioning at a particular frame per second process rate. [Highlighting, infraction member—flag which body part went? Highlight hand in red or something, show the area that they infracted—for ease of interpretability and interpretation] can also overlay other information, probabilities, digits, etc. Some of the overlay information can be linked to player data, such as player X, the wager we determined from the image can be pulled up, etc. augmented reality type of thing.

Determining the skeletal features may also include weighting the relative determinations from different fields of view of the different imaging devices. In a non-limiting example embodiment, if in the 3D space the left arm is completely not visible to one imaging device because the person is turned to the left from that FOV, the value for that imaging device's estimation of left arm coordinates can be largely disregarded in the overall estimation of that left arm pose.

In some embodiments, tray imaging device (e.g., imaging device 1104 in FIG. 11) imaging data, is used to calibrate the imaging device 104-1 for skeletal calibration. The tray imaging device may provide an accurate distance for the skeletal tracking in combination with the imaging device 104-1 as it may be a depth camera, have overlapping fields of view to generate imaging data overlapping the imaging data generated by the imaging device 104-1, and the offset between the tray imaging device and the imaging device 104-1 can be precisely pre-configured or adjusted.

According to some embodiments, for example, the skeletal calibration assigns differing weight to the differing skeletal determinations based on whether a betting duration is active. For example, the skeletal orientation between a betting position (e.g., a gaming token) and a pose moving around said token needs to be extremely accurate for the betting duration, and the processor 112 references the determined skeletal features in orientation to bet positions. In furtherance of the example, detected skeletal gestures closer to a bet spot (e.g., a first region of the gaming surface) are weighed as more significant that detected skeletal gestures further from the betting spot. For example, detected skeletal gestures which include touching bets (e.g., chip gaming tokens) in one field of view are weighted much higher as compared to a detected skeletal gesture of the gaming participant talking to beverage server in the second field of view. Skeletal poses might be initially anchored to the gaming equipment the gaming participant represented by the skeletal poses have not signed in, bought in, or began playing at a betting spot.

In some example embodiments, the extracted feature is a position or pose of the detected gaming participant. The position or pose may be determined relative to another object in the video data frame, such as, for example, a gaming patron being in a position that is too close to the gaming employee gaming participant. In some embodiments, for example, the extracted pose is a gaming activity pose, for example a pose indicative of a gaming patron gaming participant hitting or staying on the hand.

The one or more machine learning models may include a classifier machine learning model, pre-trained to detect hands in frame data and videos. In another non-limiting variant, the one or more machine learning models may include a multiclass classifier for detecting an emotion on a face of a gaming participant.

In some example embodiments, the one or more machine learning models include a machine learning model for generating bounding boxes associated with the object in the frame of the video. The bounding box machine learning model may be configured to generate a bounding box around the finger feature of each finger of the gaming participant which is used to conduct gaming. Subsequently, the bounding boxes may be used to increase visibility of the extracted feature to a reviewing user.

In example embodiments, in response to the processor 112 detecting a gaming participant in a first frame of the video data set, the processor 112 is configured to detect the same gaming participant in a second frame of the video data set. Hereinafter, where multiple frames of a video data set are discussed, it is understood that the frames are sequential as denoted by their description. For example, a second frame is understood to be sequentially after a first frame of the video data.

The skeleton may be tracked to establish, for example, a predefined 'boundary/line/border/edge/no go area' that the player should not cross. In some embodiments, the area is dynamically determined as a region in proximity to the chips after game session has started) (e.g., within 75-100 mm, which may vary, for example, based on table size). In some embodiments, the boundary is dynamically established based on a limit level for a particular game or table (e.g., for relatively low stakes, the boundary can be comparatively smaller). In some embodiments, the boundary is dynamically and automatically adjusted based on infraction/theft data for a particular gaming table or game (e.g., as actionable data is received, the boundary is automatically adjusted).

In further embodiments, the processor is configured to automatically conduct policies to ignore or de-escalate certain types of tracked infractions where tracked gesture activities are indicative of an already made intention prior to the infraction, despite the actual betting event or bet area infraction occurring after a state transition to a state when there is not betting allowed. For example, if a person is clearly reaching into his/her wallet to provide funds to establish a bet with a dealer, and was in the process of providing the funds to the dealer, the infraction may be excused. This intention can be represented, for example, through a defined movement vector of the person's appendage holding the funds in the direction of the betting area or the dealer. In some embodiments, the excusal of an infraction may be discretionary, and the system is configured to provide a user interface through which a replay can be shown to an adjudicator, such as a pit boss, showing recorded movements (in some embodiments, transformed into the common coordinate space and shown based on the spatial representation as opposed to the actual raw recordings due to bandwidth and storage space considerations), and the adjudicator can make a decision and trigger the system to ignore the infraction as required. For games such as Blackjack, where there are specific customary movements and gestures by players, these gestures can be tracked and utilized to establish the beginning or end of a time period for betting and corresponding infractions (e.g., tap or a wave for a hit/pass).

For example, in a very busy table game, such as Craps, betting may end, for example, when a dice roller begins the rolling of the dice (e.g., a late bet when the dice have been sent out or while the dice are in the air). The system can automatically track the skeleton representation of the bettor and the dice roller through various cameras that are able to observe the corresponding appendages of the bettor and the dice roller, and make a determination, based on coordinated timestamp data of when the bets were closed, and when the bet was made. This can be particularly challenging for betters when, for example, dice rollers are very fast on rolling (e.g., an aggressive roller), and in some embodiments, in an effort to preserve the momentum and ambience of a table game, the pit boss may elect to waive an infraction or review an infraction before waiving it. Accordingly, the system provides the information required to make the decision, but may be configured to avoid undesirably impeding the momentum or ambience of the game. In some embodiments, the system can be configured for automatic tolerance based on particular rules, and the tolerance may further include additional information or metadata about the players involved, such as high roller status, whether the identify of the player is known and the player has a long history of trusted play, the particular limit of a particular game, etc.

In another embodiment, the system is configured to provide a specific tolerance for minor infractions, given indicia such as appendages showing intended movement that began at least a predetermined number of frames prior to the betting stop event timestamp (e.g., dice were thrown), among others. Other types of indicia can include a reach into a wallet, among others. Conversely, there may be indicia such as specific gestures from the dealer that indicate that bets after a particular time are invalid no matter what (e.g., a tracked skeletal representation of a wave).

The processor 112 may implement a sequential relation model, such as a long short term memory (LSTM) or a gated recurrent unit (GRU), for extracting features based on processing previous sequences of frames in the video data. The sequential relation model may be pre-trained to extract features of gaming participants or gaming objects from sequential frame data. For example, processor 112 may determine or extract a hand feature from the video data based on previous sequential frames of the video data which show a gaming participant moving an elbow over a gaming surface.

In some embodiments, for example, the processor 112 processes all received video data with the sequential relation model in order to detect or extract features within the video data. For example, the machine learning model used by the processor 112 to detect gaming participants may include or incorporate a sequential relation model, trained to detect gaming participants in video data based on sequential relations exhibited by gaming participants between frames.

The processor 112 may utilize a variety of machine learning models which include a variety of model components. For example, the processor 112 may be configured to implement a machine learning model configured to detect a gaming participant with a classifier, and subsequently to detect features based on a sequential relation model.

Once the feature of the gaming participant is extracted by the processor 112, the processor 112 updates the model representation and determines whether the updated model representation satisfies an infraction threshold.

The infraction threshold may be a preconfigured threshold which is satisfied upon the detection of a feature or the detection of a feature in a particular location in a single frame of the video data.

In some embodiments, for example, the processor 112 may be preconfigured to determine that the infraction threshold is satisfied when a hand or appendage feature is detected within a predefined betting zone during a gaming duration. The predefined betting zone may be a zone where gaming participants are required to place their chips in order to participate in the game. For example, where the processor 112 detects a hand feature in a betting zone after bets have been laid down, the processor 112 may determine that the infraction threshold is satisfied. The processor 112 may automatically assume that the gaming participant is attempting pinching, i.e., remove wagered gaming tokens upon realizing a losing bet (such as, where in a game of blackjack a gaming participant removes a chip(s) when the dealer is not looking, or in the case of three card poker, where the gaming participant has a weak hand (cards), with a flick gesture, it's possible for the gaming participant to use a card to knock out chips from a stack in a single gesture while appearing to fold their hand (thereby reducing the amount of the losing wager)), or capping, i.e., increasing a wager upon realizing a winning bet (such as in blackjack, adding chip(s) to the wager after player or dealer card(s) are known, or in the case of three card poker, adding chip(s) to the ante bet once player knows their card so that the main bet can be increased (main bet cannot be greater than ante)).

In another non-limiting example, the infraction threshold may be satisfied upon the processor 112 detecting an inebriated feature in the gaming employee gaming participant. The inebriated feature may be detected by the processor 112 implementing a machine learning model using a classifier to determine a region of the face of a gaming participant, and subsequently using an autoencoder to determine whether the identified face exhibits similarities to training inebriation examples.

Processor 112 may process two or more sequential frames (e.g., the first frame and the second frame) from the video data in order to determine whether the infraction threshold and satisfied.

According to some embodiments, the processor 112 may be configured to process each frame individually and update the model representation with the features extracted from the processed individual frames. For example, the model representation may include records associated with each feature detection in single frames. Thus, the model representation may include multiple representations of a single feature across different frames.

In example embodiments, the processor 112 may be configured to update the model representation with feature representations of past positions. For example, the model representation may be continually updated with the position of the feature (e.g., a hand), however, the predicted gaming participant to whom the hand belongs to may be fixed. Thus, the model representation may include the most recent representation of the detected feature in addition to some fixed parameters.

In example embodiments, the processor 112 may be configured to detect pinching or capping based on 2 or more sequential frames. For example, the processor 112 may process with a machine learning model an updated model representation containing hand feature information for a first frame and a second frame. Where the processor 112 determines that the first frame coincides with a pre-betting duration, and the second frame coincides with a post betting duration, and the hand feature is not present in a betting zone in the first frame but is present in the betting zone in the second frame, the processor 112 may determine that the infraction threshold is satisfied.

Determining that the hand feature is in the betting zone can include determining that the hand feature overlaps the betting zone in a 3D model representation. In example embodiments, determining that the hand feature is in the betting zone is based on the betting zone occupying a predetermined location in the video data, such that any overlap between any feature and the betting zone satisfies the infraction threshold.

Determining that the frame coincides with a pre- or post betting duration may include receiving gaming start input from a detection source. For example, a card sensor may be configured to detect pre-betting durations based on the absence of a card, and communicate with the system 102 to notify the processor 112 of the card absence. According to some embodiments, for example, the processor 112 determines that the frame coincides with a pre- or post betting duration based on input received from the interactive display 304, wherein the gaming employee may input that the post betting duration has commenced.

Determining that the frame coincides with a post or pre-betting duration in example embodiments includes the processor 112 processing the sequential frame data to detect the absence or presence of gaming tokens (e.g., cards, dice), alternatively referred to as gaming start objects. The processor 112 may assign token absent frames to a pre-betting duration, and frames having tokens present to post betting durations.

According to some embodiments, the processor 112 may be configured to determine that the infraction threshold is satisfied where a gaming participant is detected as trying to engage in gaming activities after forfeiting a wager. For example, the processor 112 may be configured to maintain a log, for each gaming activity (e.g., a poker hand), of which player has excluded themselves from the gaming activity (e.g., folding). In the event that the processor determines that the player is attempting to place new wagers, the infraction threshold may be satisfied.

The processor 112 may be configured to determine that the infraction threshold is satisfied upon determining that a gaming participant is interacting with objects which do not belong to a gaming participant.

In one example embodiment, the processor 112 is configured to extract gaming token features from the sequential frame data and assign a likely ownership value to a gaming participant for each extracted gaming token. For example, the processor 112 may assign a heightened ownership value to a gaming participant in relation to gaming tokens which are closest to the gaming participant through the sequence frame data.

According to some embodiments, for example, the processor 112 is configured to detect gaming token features at all times, and assign a high likely ownership value to the gaming participant first detected near the gaming tokens. For example, processor 112 may determine the gaming participant who enters the frame with gaming tokens as the likely owner of the gaming tokens.

Similarly, the processor 112 may be configured to assign a high likely ownership value to a gaming participant based on a preconfigured or pre-trained sequence. For example, the processor 112 may be configured to assign the gaming patron gaming participant who receives gaming tokens from a gaming employee gaming participant a high likely ownership value.

In response to determining that a gaming participant with a low ownership value of the gaming tokens overlaps or touches said tokens, processor 112 may determine that the infraction threshold is satisfied. For example, the processor 112 may determine that a bystander touching the chip gaming tokens of the gaming participant satisfies an infraction threshold.

In example embodiments, the processor 112 assigns a dynamic ownership value to the detected gaming tokens. For example, the processor 112 may assign a high ownership value of a card gaming token to an employee during a pre-betting duration, and subsequently assigned a low ownership value to the employee during a post-betting duration. Thus, an employee who attempts to, for example, rearrange a deck during the middle of a round, may cause the processor 112 to determine the infraction threshold has been satisfied.

The processor 112 may process the sequential frame data to determine gestures being performed by the gaming participant. For example, the processor 112 may process the first and second frame, retrieve a gesture definition or gesture definition database having one or more one or more gesture definitions associated with feature changes over successive frames, and determine whether the feature and the updated feature (i.e., the feature associated with the second frame stored in the model representation) of the model representation satisfy a similarly criteria with any of the one or more gesture definitions. In a non-limiting example embodiment, the processor 112 may determine whether the detected hand feature of the gaming participant is sufficiently similar to the hit or stay gesture definitions stored in the gesture database.

The processor 112 may process the sequential frame data to determine a gaze feature of the gaming participant to determine whether the infraction threshold is satisfied. For example, where an eye feature of the gaming participant is determined to directed to a first direction during a minimum gaze threshold, which first direction does not include a field of view of the gaming tokens required to play the game (e.g., the player is not looking at the cards and making active choices), the processor 112 may determine that the infraction threshold is satisfied.

According to some embodiments, the processor 112 may process the sequential frame data to determine a pose feature of the gaming participant to determine whether the infraction threshold is satisfied. Where the pose feature shares sufficient similarity with a pre-determined inebriated pose, the processor 112 may determine that the infraction threshold has been satisfied.

The pose feature may be used to determine whether a gaming participant is likely cheating or coordinating with another gaming participant, satisfying the infraction threshold. For example, where the processor 112 determines a gaming participant has a pose which repeats in relation to events within a gaming activity, such as a cough or otherwise, the processor 112 may determine the pose feature satisfies the infraction threshold.

In example embodiments, the processor 112 processes frame data from the RGB imaging device 104-1, in combination with infrared frame data of the infrared imaging device 104-2. According to some example embodiments, the system for tracking gaming activity only includes an infrared imaging device 104-2, and the processor 112 exclusively processes infrared frame data from the infrared imaging camera 104-2.

The processor 112 extracts, from a first infrared frame of the infrared frame data, an infrared feature of the gaming participant. Similar to extracting features from the frame data of the first imaging device 104-1, the processor 112 may use a convolutional neural network, or other machine learning architectures or algorithms to detect the gaming participant. For example, the processor 112 may process the first infrared frame to determine a hand feature. In example embodiments, the processor 112 extracts the infrared feature of the gaming participant in a manner similar to extracted features of the gaming participant from frame data.

In example embodiments, the processor 112 is configured to associate extracted features from the first frame and the infrared first frame belonging to a single gaming participant. For example, the processor 112 may associate an extracted hand feature from the first infrared frame with an extracted hand feature in a first frame, where the extracted hand feature belongs to the same gaming participant.

In example embodiments the processor 112 determines whether features are associated with one another based on a degree of similarity. For example, where the extracted hand feature and the extracted infrared hand feature are sufficiently similar (e.g., finger lengths are sufficiently similar, finger thicknesses are sufficiently similar, orientations are sufficiently similar, and so forth), the processor 112 may determine that the two features satisfy the degree of similarity, and associate the two features with one another.

In some embodiments, for example, the degree of similarity may be satisfied based on a previous location of the extracted feature. For example, the processor 112 may determine that the infrared feature and a feature representative of a hand feature are sufficiently similar where they include a similar pixel representation and are substantially in a similar position compared to where a hand feature was previously detected or stored in the model representation.

In some variants, where the imaging devices 104 are calibrated based on the same reference object, the degree of similarity may be satisfied where the extracted features are determined to be in the same location. For example, the processor 112 may determine that an infrared feature and a feature are sufficiently similar where they are both in the same location (or in a substantially similar location) within the model representation.

According to some embodiments, for example, the processor 112 may be configured to receive, or process, and synchronize received frame data (e.g., frame data, infrared frame data, etc.). According to some embodiments, the processor 112 is configured to transmit the received frame data to the synchronizer 120 for processing.

In example embodiments, the imaging devices 104 may be configured to timestamp frame data according to an internal clock of the respective imaging device 104. The respective imaging devices 104 may be preconfigured to share a synchronized time during an initial configuration. In some embodiments, for example, the respective imaging devices 104 are configured to periodically query and update their internal clock based on a master time received from the processor 112 or synchronizer 120.

In some embodiments, for example, processor 112 and the imaging devices 104 are connected to the synchronizer 120, and receive from the synchronizer 120 a reference time (or time stamp) to associate with received or captured frame data. In another non-limiting example embodiment, the synchronizer 120 may be calibrated to provide the processor 112 with a reference time which accounts for the delay in the transmission of the frame data (i.e., includes an offset time) from the imaging devices 104 to the processor 112, and provides the imaging devices 104 with a second reference time for timestamping. The synchronizer 120 may be connected, via a dedicated or shared sync cable, to the imaging devices.

Subsequently, the processor 112 may be configured to process the received frame data based chronologically according to timestamp, based on whether the time stamp of the frame data matches the received reference time from the synchronizer 120.

In a non-limiting example, the imaging devices 104 may be configured to directly stream captured frame data to the processor 112, and the processor 112 may be configured to timestamp all received imaging data with the reference timestamp from the synchronizer 120.

Each data entry in the model representation associated with a feature may include timestamp data associated with the time in which the feature was detected. For example, where the infrared feature and a feature from two different imaging devices satisfied a degree of similarity, if the features were extracted from frame data sharing the same timestamp, the extracted feature representations may be stored in a model representation data entry associated with the specific timestamp. In another non-limiting example, where the features were extracted from frame data having different timestamps, the extracted feature representations may be stored in the model representation separately, and associated with the two different timestamps.

In embodiments where the infrared imaging device 104-2 is used in conjunction with the RGB imaging device 104-1, the extracted infrared feature may be incorporated into the determination of whether an infraction threshold has been satisfied.

According to some example embodiments, the processor 112 is configured to extract infrared features of the gaming participant similar to the features of the gaming participant extracted from the frame data, in order to have two separate representations of the same feature, which can be associated within the model representation. Combining the infrared frame data and the frame data may beneficially allow the system for tracking gaming activity to decrease the amount of false positives associated with the infraction threshold.

Thus, where the infrared feature is an infrared hand representation, the processor 112 may be configured to process the hand feature extracted from frame data and the infrared hand feature associated with the hand of the gaming participant and update the model representation to determine whether the model representation of the hand is within a predefined betting zone. For example, the orientation and resolution of the RGB imaging device 104-1 may indicate that the hand of the gaming participant is in the predefined betting zone, however, the infrared hand representation, as a result of the second orientation, may determine that the hand is not in the predefined betting zone.

In another non-limiting example embodiment, the detected infrared hand feature may similarly be incorporated into the updated model representation along with a detected feature of a hand to determine whether the features are associated with a gesture definition within a gesture definition database. For example, detected infrared hand features may increase the accuracy of detecting gestures (e.g., hits, or passes, or the like) based on gesture definitions by providing a contemporaneous observation.

According to some example embodiments, the processor 112 extracts features otherwise invisible to the RGB imaging device 104-1 to incorporate into the determination of whether the infraction threshold is satisfied. For example, the processor 112 may extract an infrared feature of the gaming participant that is associated with a temperature of a bodily region of the gaming participant. The extracted infrared feature may be a temperature of a face or a specific region of the user's face, such as the forehead, or a temperature derived metric such as a heart rate. In this manner, the extracted infrared features may allow the system for tracking gaming activity to detect features otherwise invisible to the RGB imaging device 104-1, and incorporate said infrared features into the determination of whether the infraction threshold is satisfied.

In a non-limiting example embodiment, the extracted infrared feature is a heart rate of the determined bodily region of the gaming participant. For example, the processor 112 may be configured to determine the location of the forehead of the gaming participant, and, based on temperature variation between infrared frame data, determine the heart beat of the gaming participant by associating temperature changes between infrared frame data with the heart pumping blood.

The extracted infrared features may also be used to determine whether a safety threshold has been satisfied. For example, where the heart rate and temperature of a player are associated with shock or illness, the processor 112 may determine that a safety threshold has been satisfied, and alert nearby medical staff or other gaming staff to follow up with the gaming participant to see whether further medical assistance is necessary. Beneficially, the extracted infrared features may allow for detection of conditions otherwise invisible to RGB cameras.

In some embodiments, for example, the processor 112 may be configured to incorporate an extracted heart rate feature into the updated model representation used to determine whether the infraction threshold is satisfied. For example, the processor 112 processing the updated model representation may determine that sudden heart rate increases within the gaming participant at periods of time during which there is no betting activity, or there is no imminent betting activity, satisfies the infraction threshold. In this way, the infraction threshold can be used to possibly detect individual's apprehension at engaging in cheating or other illicit behaviour prior to the beginning of betting activity.

The processor 112 may be configured to determine whether the extracted infrared feature of the heart rate satisfies a disqualification threshold. The disqualification threshold may be based on the detected heart rate having a sufficient degree of similarity with an inebriated or impaired heart beat. For example, where the processor 112 determines that the detected temperature of the gaming participant is below a threshold associated with extreme inebriation, the disqualification threshold may be satisfied.

According to some embodiments, for example, the extracted infrared feature is an object infrared feature, not associated with the gaming participant.

In some embodiments, the object infrared feature is used to supplement information about the gaming participant. For example, incorporating the detected object infrared feature into the model representation may allow the processor 112 to determine an existing extracted feature, which was previously unclassified, is a hand feature holding a beer or other cool beverage, as a result of the extracted object infrared feature. In another non-limiting example embodiment, the object infrared feature may be a temperature of a lit cigarette, or an infrared representation of smoke, and the infraction threshold may be satisfied if a system for tracking gaming activity detects a lit cigarette in a non-smoking zone of the gaming establishment.

In some embodiments, the temperature infrared object feature is used to determine whether a gaming participant interacted with the object in question. For example, the processor 112 may be configured to process the updated model representation and search for instances where a first frame (or first infrared frame) has a temperature infrared object feature that is indicative of the object in question not being touched (e.g., the object is at room temperature). The processor 112 may further process the updated model representation for extracted features from a second subsequent frame wherein the temperature infrared object feature is indicative of the object in question being touched (e.g., the object has a temperature greater than the previous room temperature). The processor 112 may determine that the heat transfer occurred as a result of a gaming participant interacting with the gaming object, and determine the gaming participant responsible for the transfer by determining which gaming participant was closest to the gaming object between temperature variations.

The processor 112, in response to determining the gaming participant responsible for touching the object, may determine that the infraction threshold has been satisfied. For example, where the gaming participant responsible for touching the object is other than the gaming participant determined to own the object in question, the infraction threshold may be satisfied. In another non-limiting embodiment, where the gaming participant is determined to have been touching the object during a betting duration (e.g., pinching or capping), the infraction threshold may be satisfied.

Alternatively, the object infrared feature may be used independent of its relation to the gaming participant. For example, with the object infrared feature is the temperature of a beverage, the processor 112 may determine that the infraction threshold is satisfied where the beverage is too hot (e.g., a hot beer), where the infraction threshold is used to measure patron satisfaction.

In another non-limiting example embodiment, the object infrared feature is a temperature of the gaming equipment. The gaming equipment temperature may be determined based on the processor 112 measuring a temperature feature associated with gaming equipment in the frame data, or the temperature may be determined based on the temperature feature in close proximity to the gaming equipment in the frame data. For example, the gaming equipment temperature may be determined by detecting the air temperature near an exhaust port of the gaming equipment.

In response to determining that the gaming equipment temperature is above a manufacturer recommended operating temperature, the processor 112 may determine that the infraction threshold has been satisfied. According to some embodiments, for example, in response to determining that the gaming equipment temperature is indicative of a pending malfunction, the processor 112 may determine that the infraction threshold is satisfied.

In some variants, the system for tracking gaming activity includes one or more RGB imaging devices 104, and one or more infrared imaging devices, having a different field of view, allowing for tracking of gaming objects and gaming participants across an expanded field of view.

In some embodiments, for example, the infrared imaging device 104-2 may have a field of view of a bar within the gaming establishment, and the RGB imaging device 104-1 may have a field of view of the gaming surface. The system for tracking gaming activity may be configured to track all beverages dispensed from the bar via the infrared imaging device 104-2, and subsequently through the RGB imaging device 104-1, to ensure that beverages are not tampered with before being brought to gaming participants, where detecting variations at a distance may be more accurate with an infrared camera.

According to a further non-limiting example embodiment, the infrared imaging device 104-2 may have a field of view which is directed towards the a poorly illuminated area associated with the gaming activities, such as the underside of a gaming surface, and the RGB imaging device 104-1 may have a field of view directed towards well lit areas associated with the gaming activities. For example, the RGB imaging device 104-1 can be used to track players and on top of a well lit gaming surface, quality infrared imaging device 104-2 can be used to track gaming participant's hand in the poorly written lit region under the gaming surface.

Example embodiments of the system for tracking gaming activity also include more than one RGB camera 104-1.

Figure 10A:
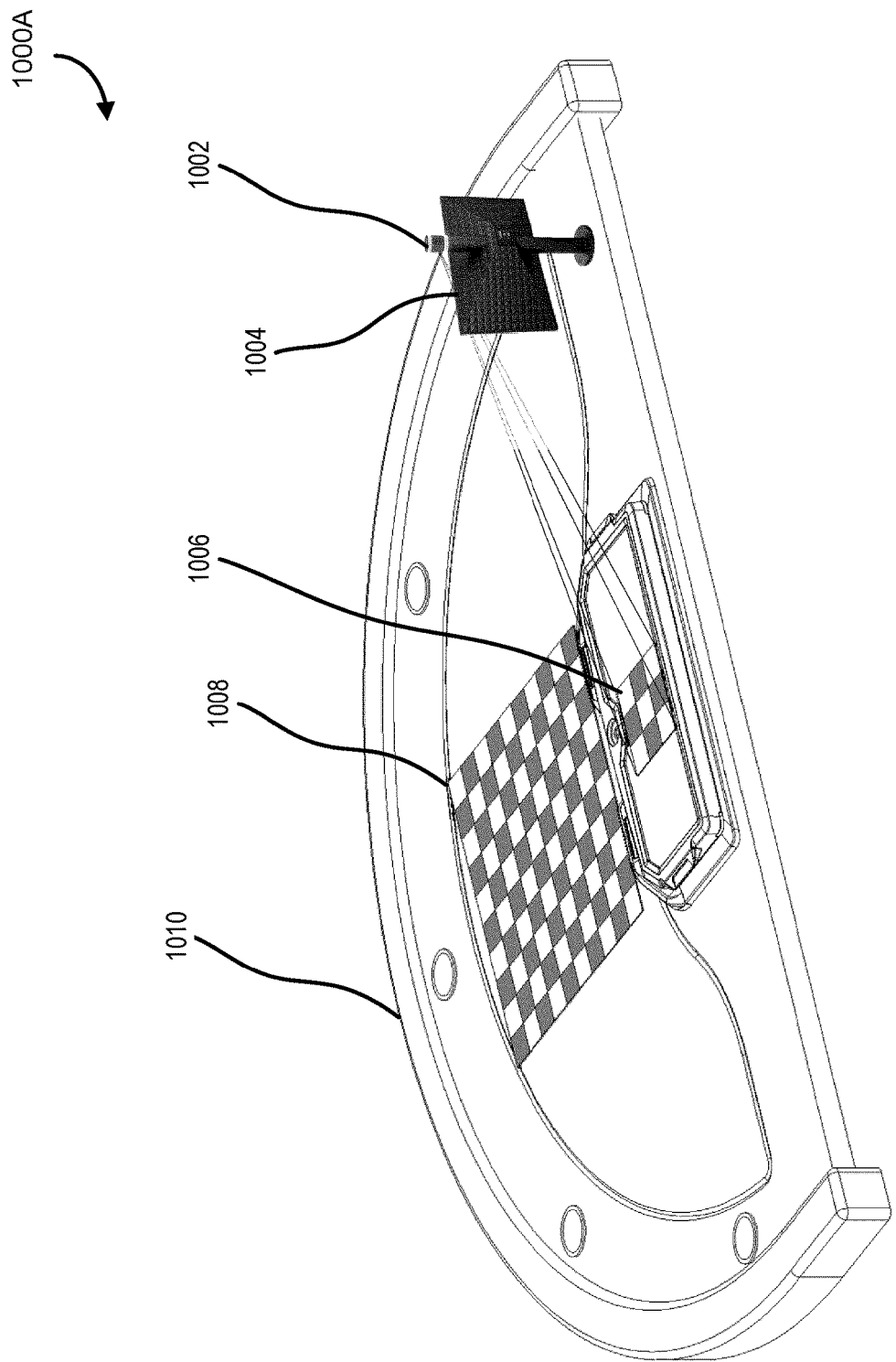
FIG. 10A is a diagram of gaming surface calibration for a system for tracking gaming activity for related gaming surfaces, according to some embodiments.

Referring now to FIG. 10A, example system 1000 for tracking gaming activity includes the imaging device 1002 mounted on top of the display system 1004.

System 1000 includes multiple reference objects on the gaming surface, namely reference object surface 1006 and reference object surface 1008, which are used to calibrate the imaging device 1002 based on varying contours of the gaming surface of gaming equipment 1010.

Figure 10B:
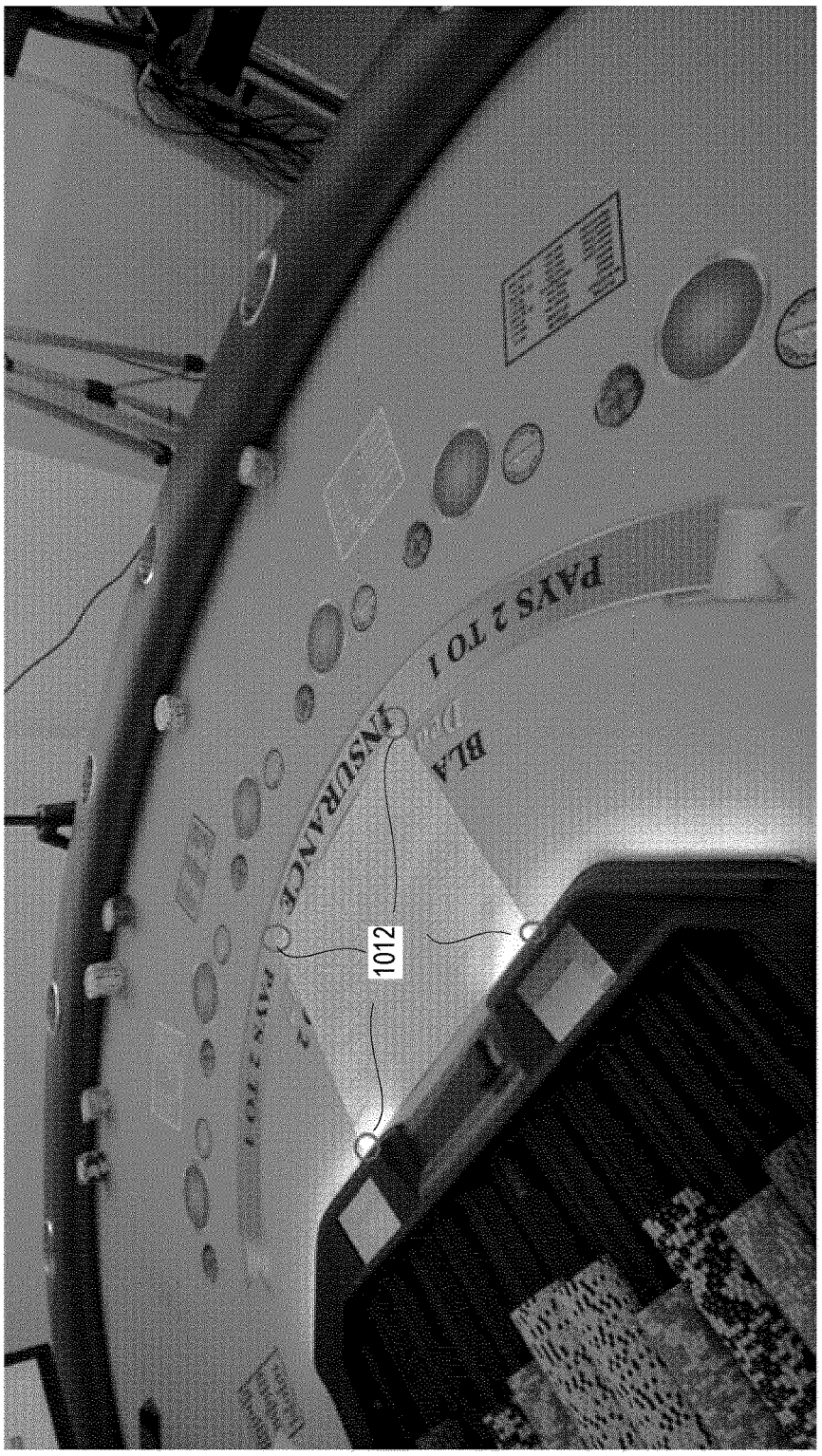
FIG. 10B is a perspective illustration of an alternate approach for calibration using an object with known geometry and vertex detection, according to some embodiments.

FIG. 10B is a perspective illustration 1000B of an alternate approach for calibration using an object with known geometry and vertex detection, according to some embodiments. In this example, instead of the checkboard based approach shown in some embodiments, a piece of paper can be utilized as the geometry of the paper is known.

This is a simplified approach that can reduce the complexity of deployment.

The steps can include:

(A) Place a fresh new paper with the predefined 2D-relation to the ROI area on the table, (B) the system detects the four vertices of paper by color filtering, contour detection and polygon fitting, then uses these coordinates as well as the know sizes of the paper to calculate the image perspective transform matrix, (C), through the transform obtained from step B, a rectified image of the table is obtained as well as the card in image. At (D), the card area can be detected through background removal, and at (E), card rank and value recognition is done through pattern recognition using the rectified image obtained from step C.

Figure 10C:
FIG. 10C is a perspective illustration of an alternate approach for calibration showing an example gaming token being detected before a rectification transformation, according to some embodiments.

FIG. 10C is a perspective illustration 1000C of the alternate approach for calibration showing an example gaming token 1014 being detected before a rectification transformation, according to some embodiments. In this example, after the transformation matrix in Step B has been established, it can now be used to establish the coordinates of the playing card in accordance with a 2D or a 3D spatial model. In this example, the gaming token 1014 is a ten of clubs.

Figure 10D:
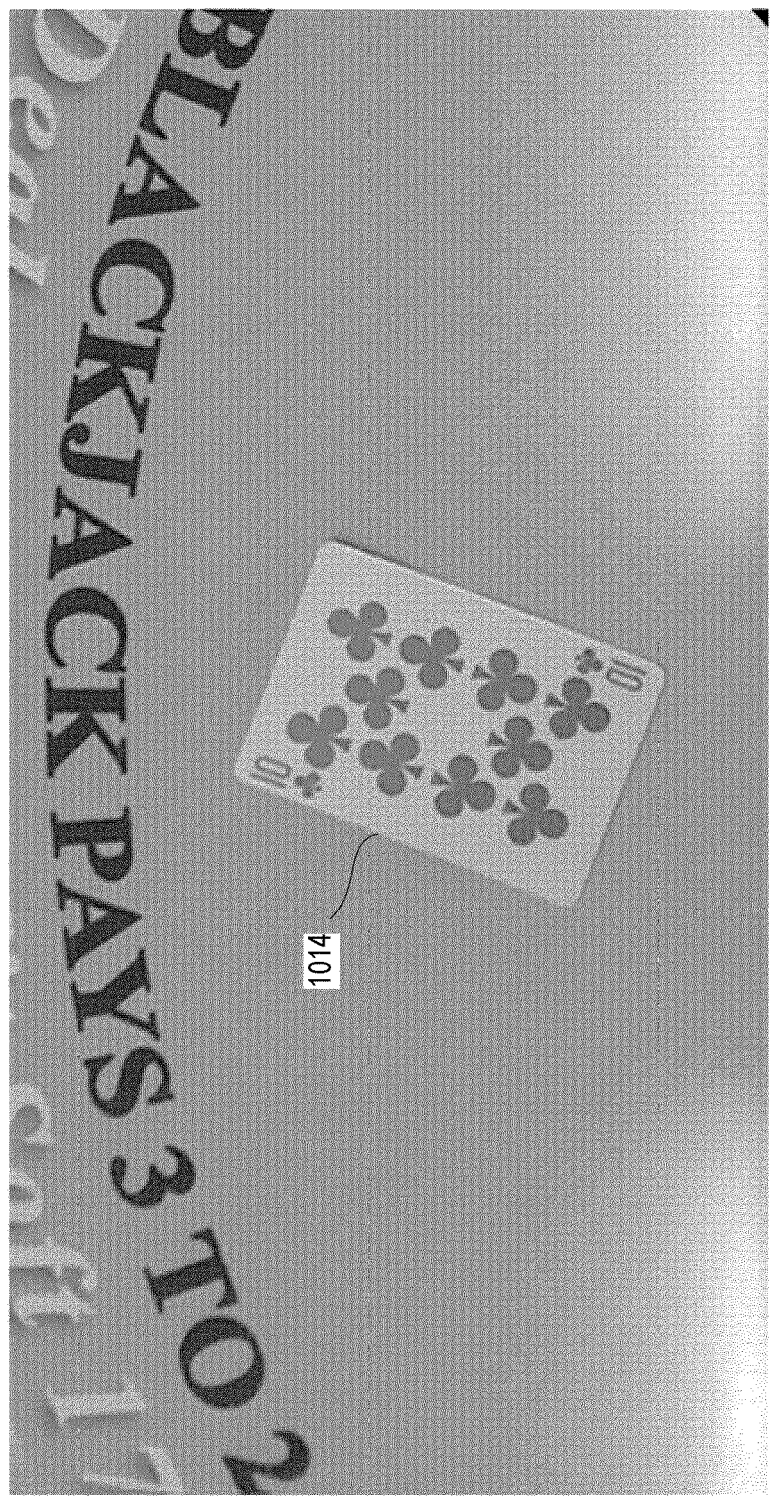
FIG. 10D is an example image capture of a rectified image, according to some embodiments.

FIG. 10D is an example image capture 1000D of a rectified image 1014, according to some embodiments. Note in this example, the image has been rectified such that the perspective is transformed using the matrix to correct for color and/or orientation/distortion, and the rectified image 1014 now captures the physical geometry relative to a Cartesian/Euclidean model despite the perspective and distortion from the camera. The rectified image 1014 has physical attributes, which, for example, can be used in conjunction with other cameras and other devices as they have a common color space or coordinate space.

Figure 10E:
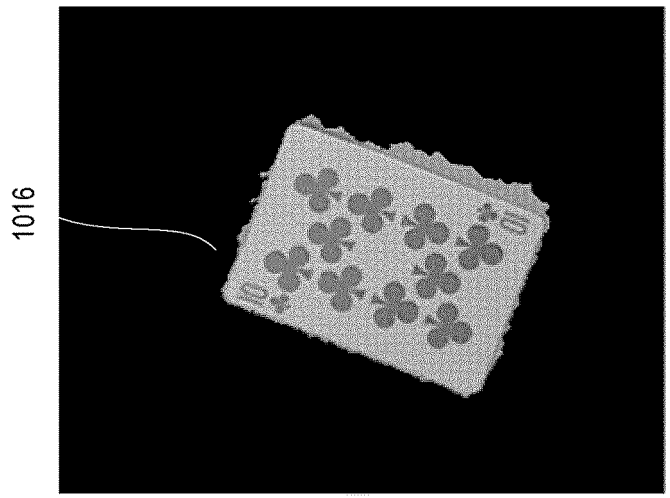
FIG. 10E is an example image capture of a detected card having a background removed, according to some embodiments.

FIG. 10E is an example image capture 100E of a detected card 1016 having a background removed, according to some embodiments. In this example, the background has been removed, and the card can now be processed using pattern recognition approaches to determine a card rank, a card suit, and to track other aspects, such as abnormal wear and tear, whether it was touched by a player or not (e.g., then it needs to be flagged for discarding), among others.

Figure 10F:
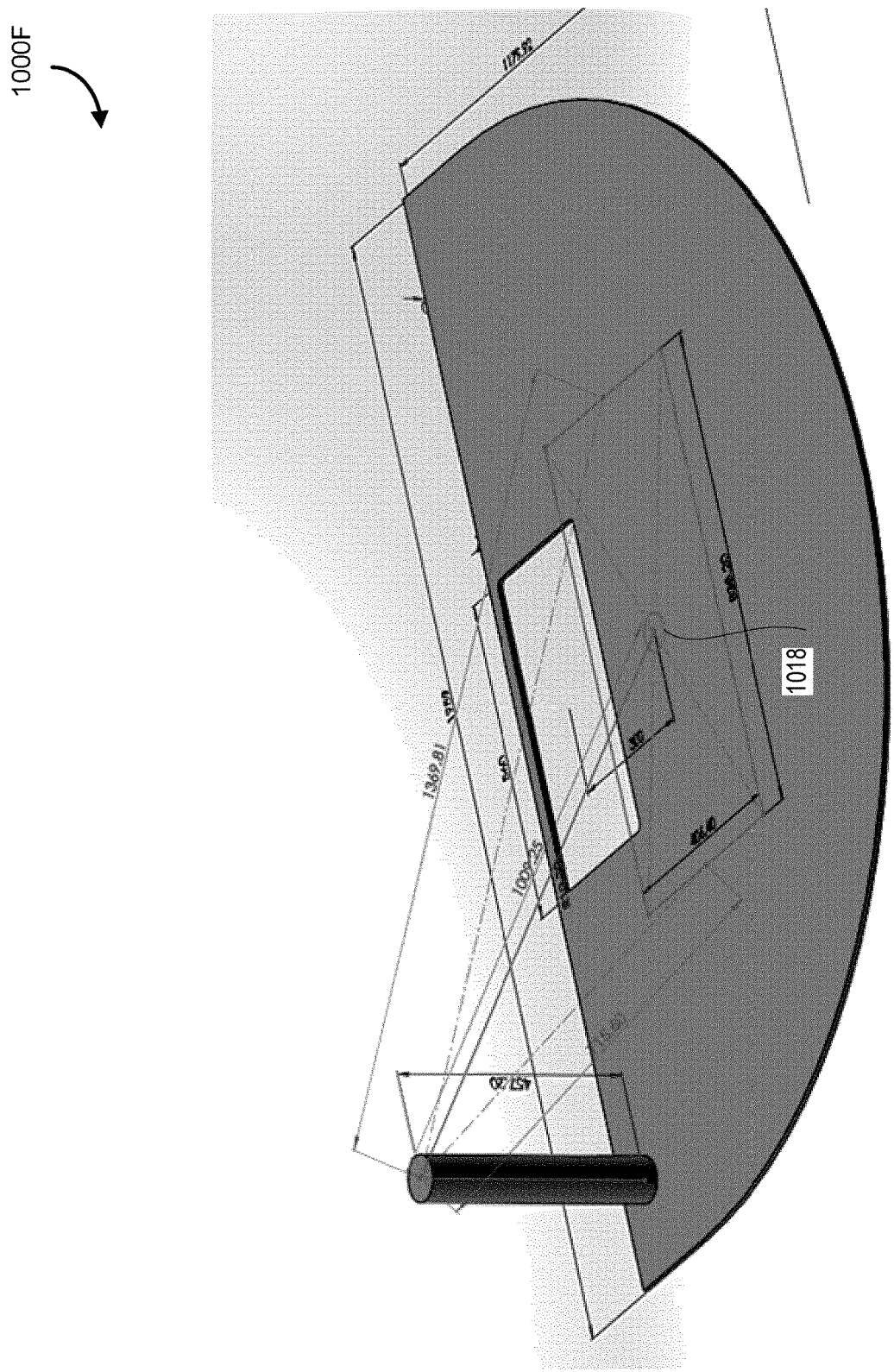
FIG. 10F is a perspective rendering of a foreign object being detected by the system, according to some embodiments.

FIG. 10F is a perspective rendering 1000F of a foreign object 1018 being detected by the system, according to some embodiments.

Similarly, as no foreign objects other than chips and cards are expected on the specified area of the table, the system can also be configured to detect foreign objects and raise, for example, an infraction alarm signal if a foreign object is detected.

Example steps for foreign object detection can include:
a. Build the background model of the targeted table area
b. Get all objects on table through background removal
c. Detect card and filter them away (using the approach mentioned above)
d. Detect chips and filter them away.

In a first approach, the use camera intrinsic parameters and table plane transform matrix mentioned above to build all possible chip planes with respect to the camera (in world coordinates, they can be established as layers of planes parallel to the table plane with chip height as their vertical distance to each other) and calculate their transform matrix respectively.

In another approach, for each object, transform them with the above matrices and recognize whether they are chips according to the specified chip size and patters on the chip surface.

e. If there are remaining non identified objects above a minimum size, an estimated foreign object is flagged and the system can be configured to transmit or generate a warning, or can be configured to record parameters or events around the timestamp of the tracked foreign object flagging.

Figure 11:
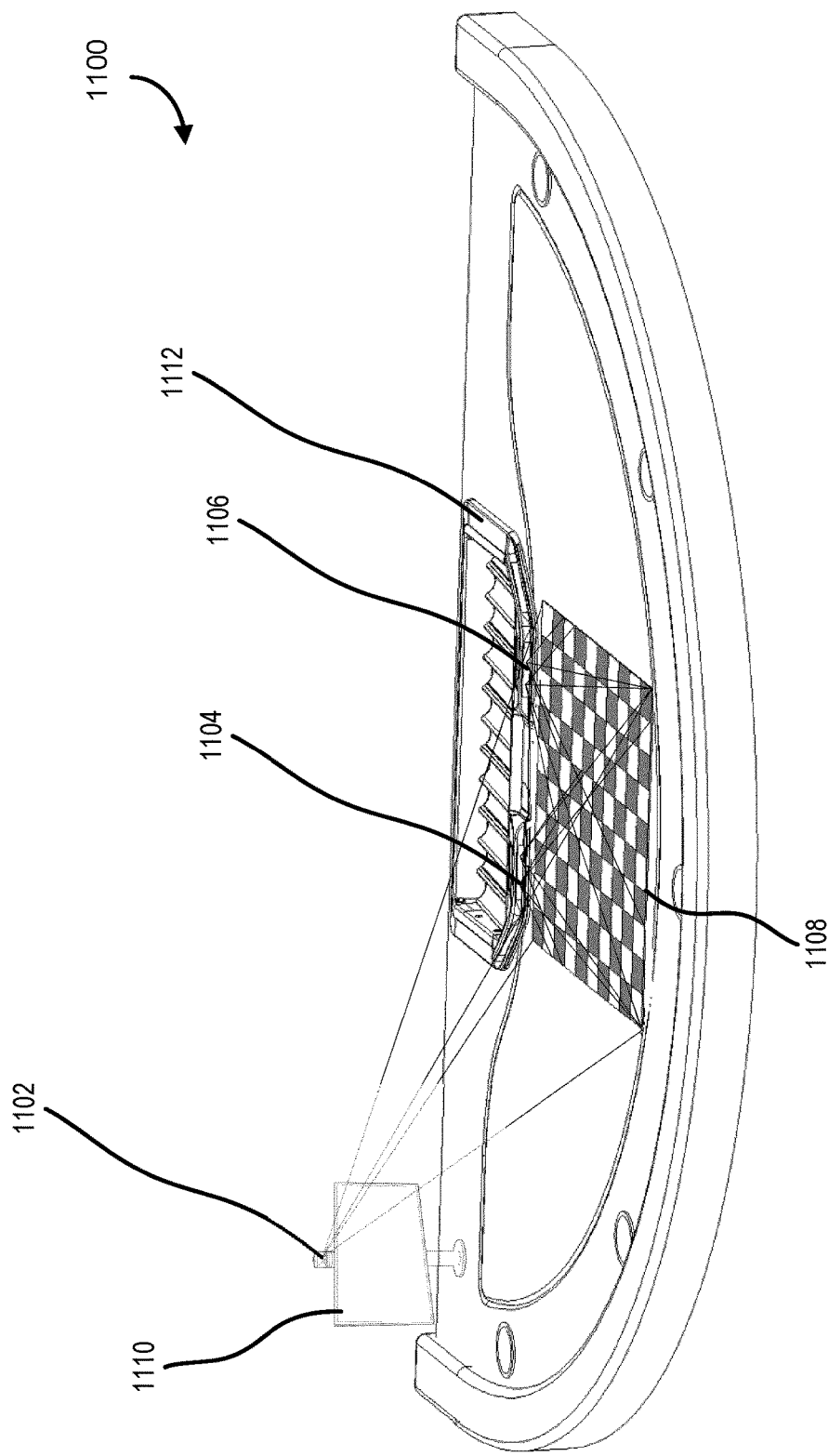
FIG. 11 is a diagram of gaming surface calibration for a system for tracking gaming activity having multiple imaging devices, according to some embodiments.

Referring now to FIG. 11, according to some embodiments, for example, the system for tracking gaming activity includes a first RGB imaging device 1102 (mounted on the display system 1110), a second RGB imaging device 1104, and third RGB imaging device 1106. In the shown embodiment, the second RGB imaging device 1104 and the third RGB imaging device 1106 are embedded in a chip tray 1112 having a field of view of the gaming surface 1108 (e.g., shown in FIG. 11 as having a calibration surface).

Frame data from each of the RGB cameras (first RGB imaging device 1102, a second RGB imaging device 1104, and third RGB imaging device 1106) may be used to update the model representation with the detected features. For example, where each of the imaging devices detects a hand feature of the gaming participant, the frame data, and the data associated with the detected feature, may be used to update the model representation to include the separate detections.

The processor 112 may be configured to incorporate data associated with an extracted feature for multiple imaging devices to determine whether the infraction threshold has been satisfied. For example, the processor 112 can be configured to determine an authoritative extracted feature from a particular imaging device. In example embodiments, the processor 112 determines the authoritative extracted feature based on the degree of similarity with previous extracted features within the same region. In some variants, the processor 112 generates an authoritative extracted feature by averaging all available extracted features from different frame data sets. Various combinations of determining authoritative extracted feature information are contemplated, including weighted averaging of the various extracted features of the same feature.

Figure 12A:
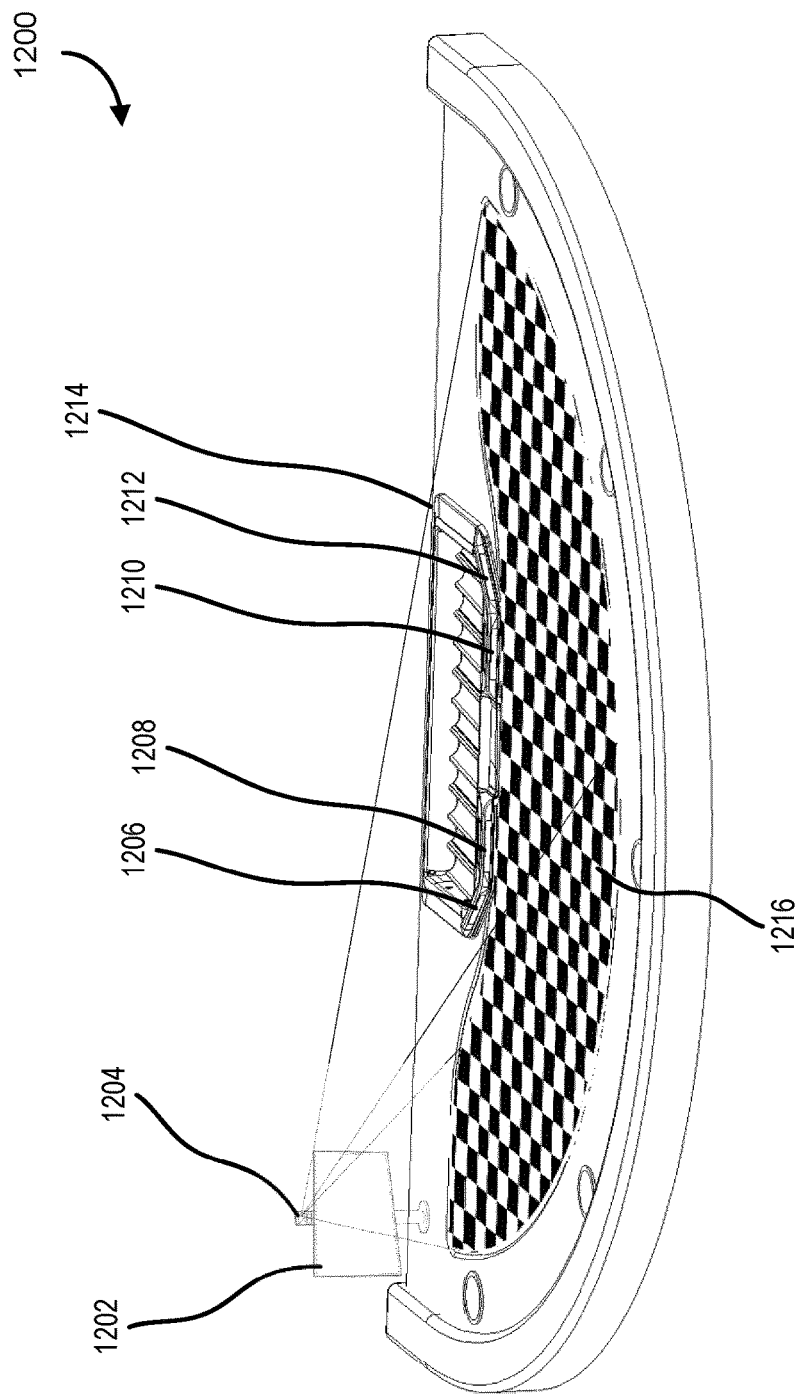
FIGS. 12A-12C show further diagrams of an example system for tracking gaming activity having multiple cameras, according to some embodiments.
Figure 12B:
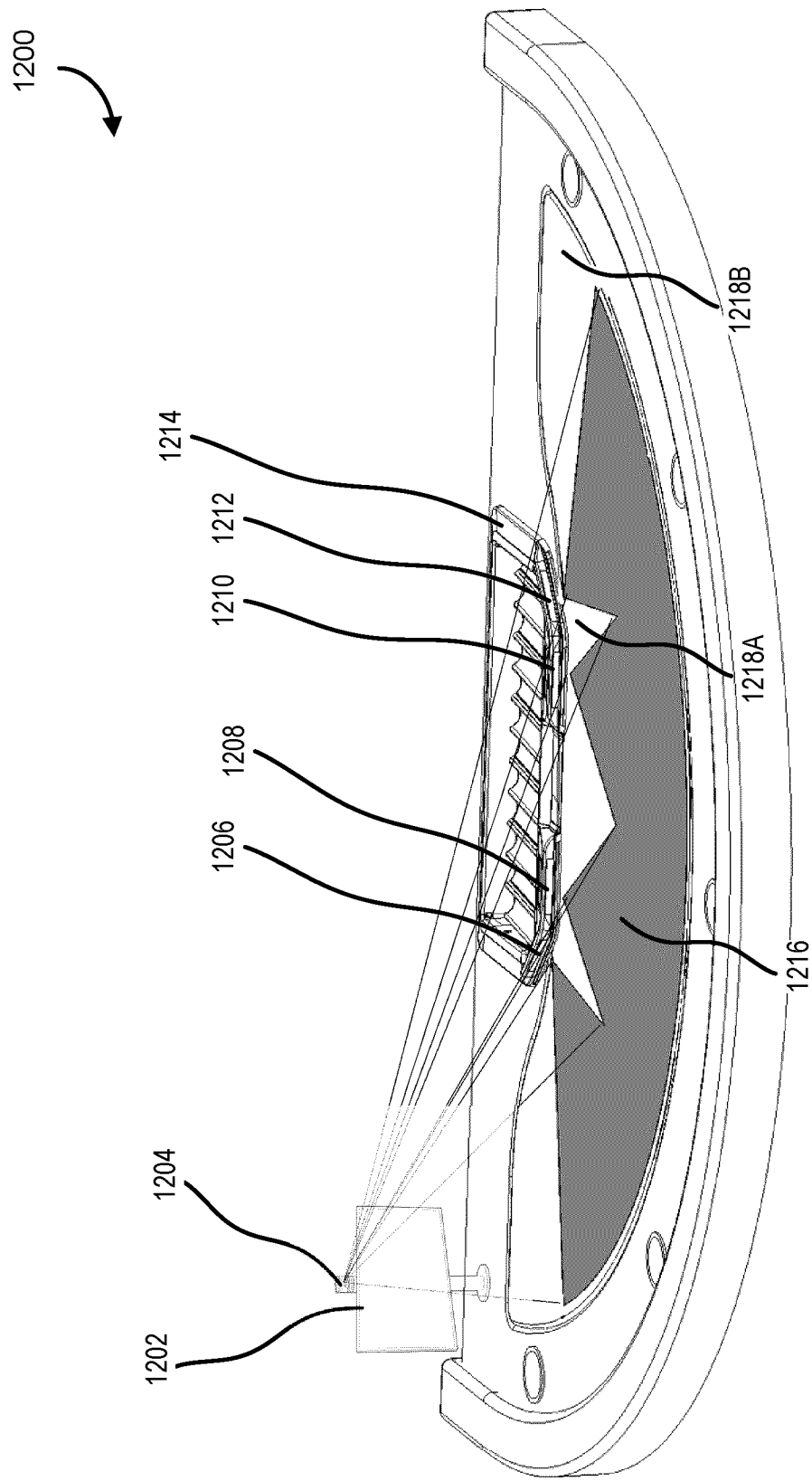
Figure 12C:
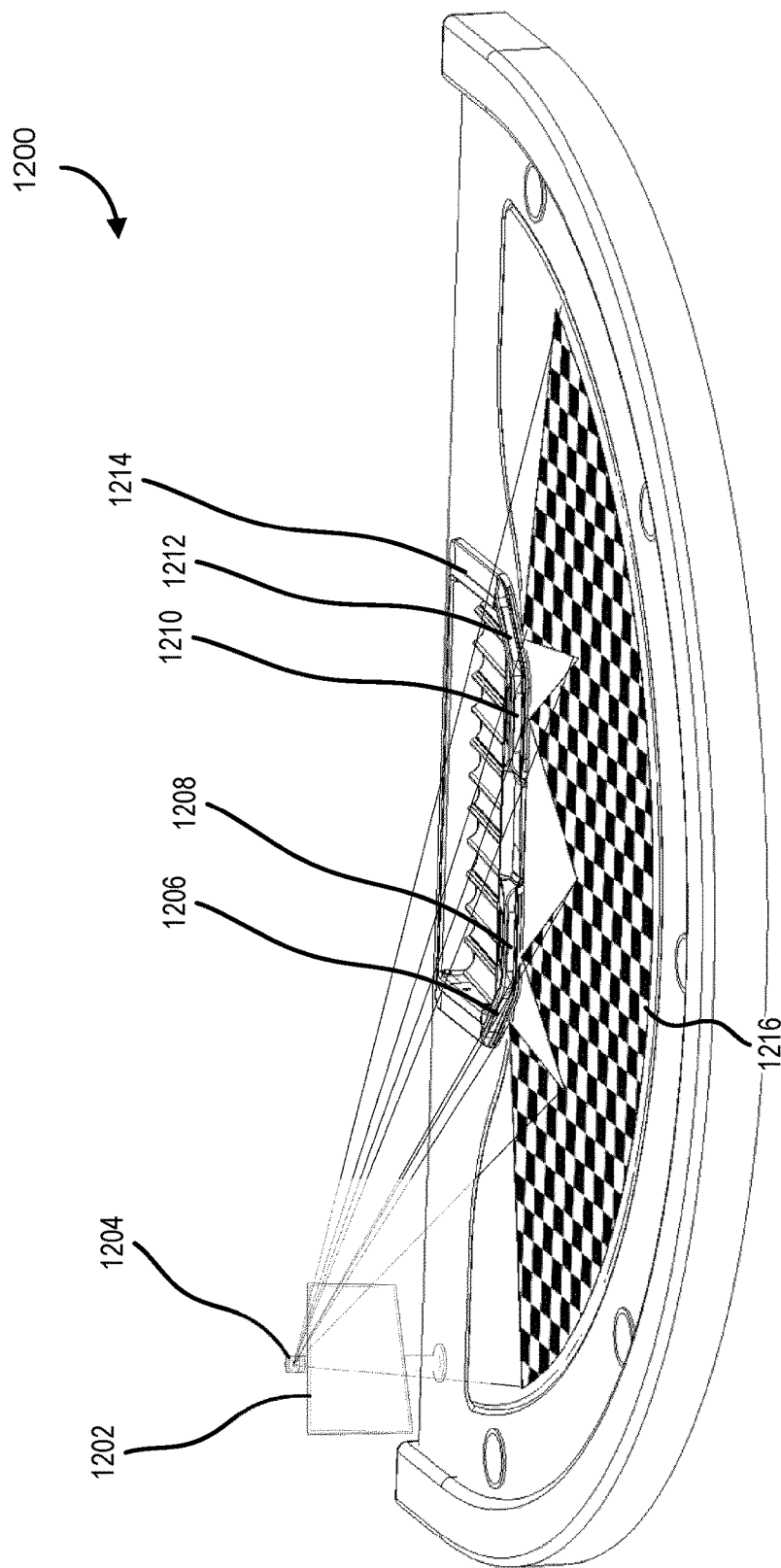

FIGS. 12A-12C show diagrams of system 1200 for tracking gaming activity having multiple cameras, according to some embodiments.

In the shown embodiments, the system 1200 includes imaging device 1204, mounted on display unit 1202 at a first height relative to the gaming surface, and tray imaging devices 1206, 1208, 1210, 1212, mounted at a second height into the chip tray 1214.

The various imaging devices may be arranged to ensure that the entire gaming surface 1216 is within a field of view of at least one imaging device. According to some embodiments, the imaging devices are arranged around the gaming surface 1216 such that each area on the gaming surface is captured by overlapping fields of view of more than one imaging device. Various overlapping or independent fields of view relative to the gaming surface 1216, are contemplated, such as embodiments where a first region of the gaming surface 1216 is captured by multiple imaging devices, and a second region of the gaming surface 1216 is captured by a single imaging device.

The display mounted imaging device 1204 may be mounted on the display 1202 to have a field of view which incorporates the blind spots of other imaging devices. For example, in the shown embodiments in FIGS. 12B and 12C, the field of view each of the tray imaging devices 1206, 1208, 1210, 1212, including blind spots (shown by blind spot 1218A, and blind spot 1218B, for example), and the first imaging device 104 is mounted on the display system 1202 to have a field of view which includes the blind spots.

Calibrating the multiple imaging devices within the system 1200 may include the use of the calibrating pattern in the field of view of the tray imaging devices 1206, 1208, 1210, 1212, as shown in FIG. 12C.

Figure 13A:
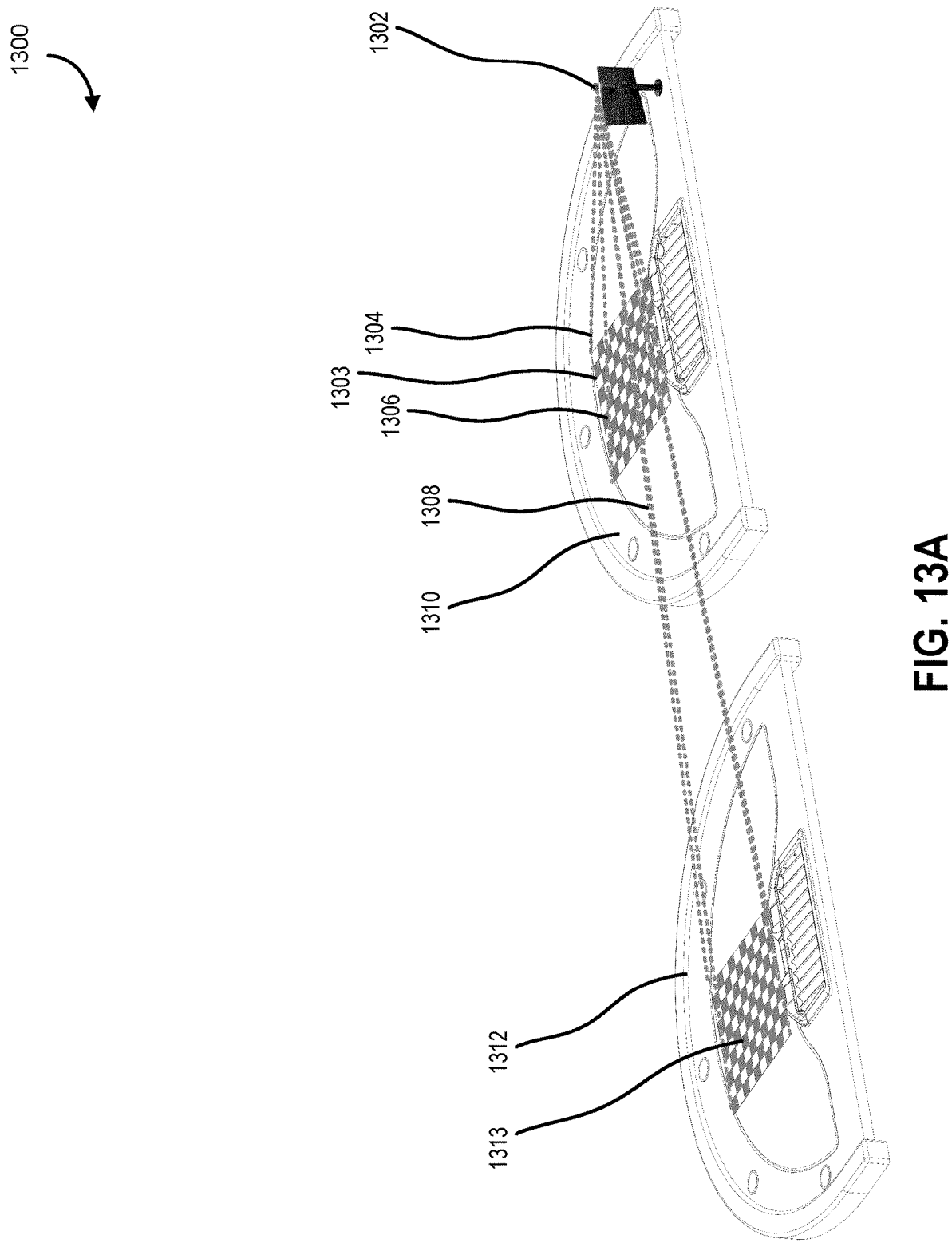
FIGS. 13A-13C are diagrams of example systems for tracking gaming activity on multiple gaming surfaces, according to various embodiments.
Figure 13B:
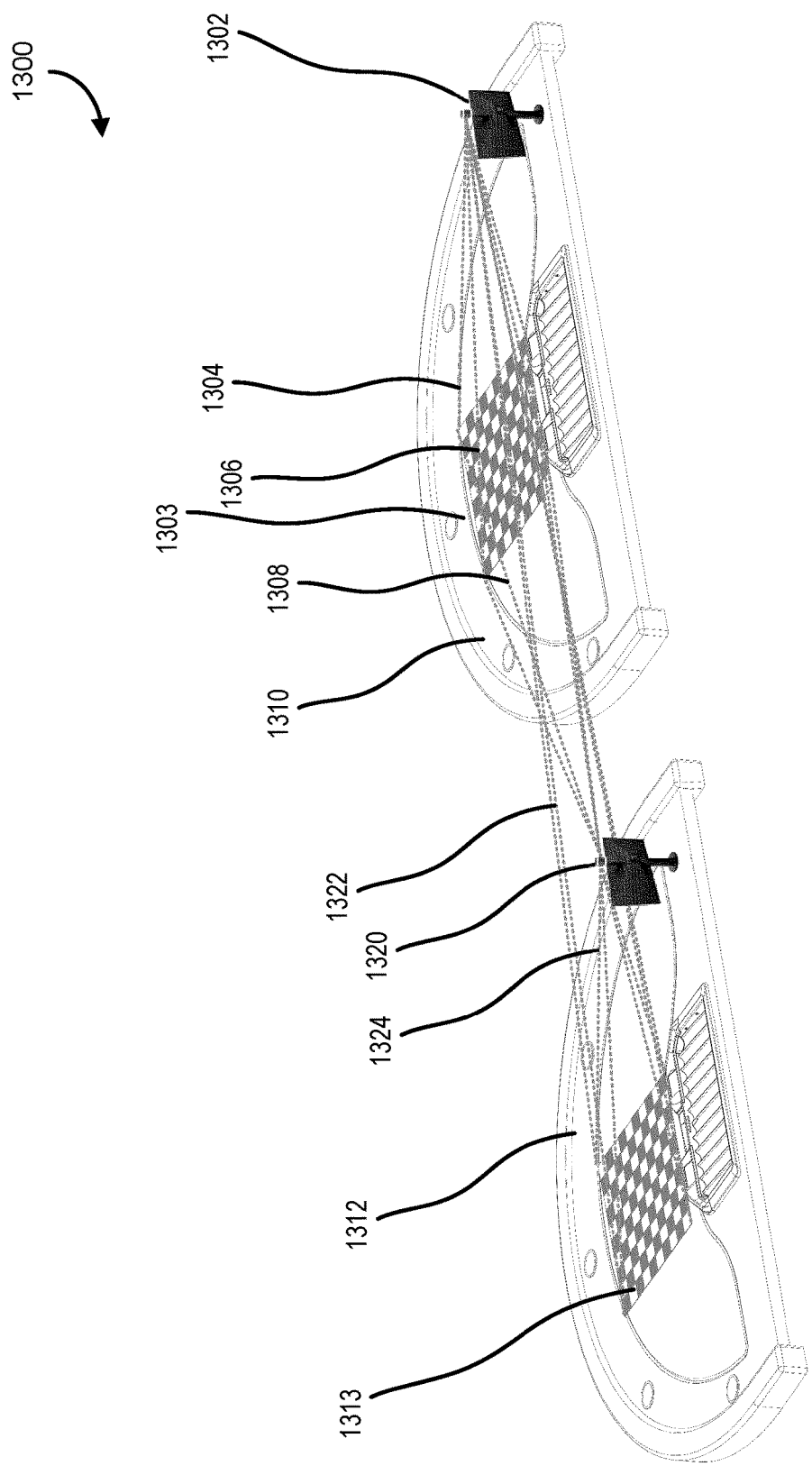
Figure 13C:
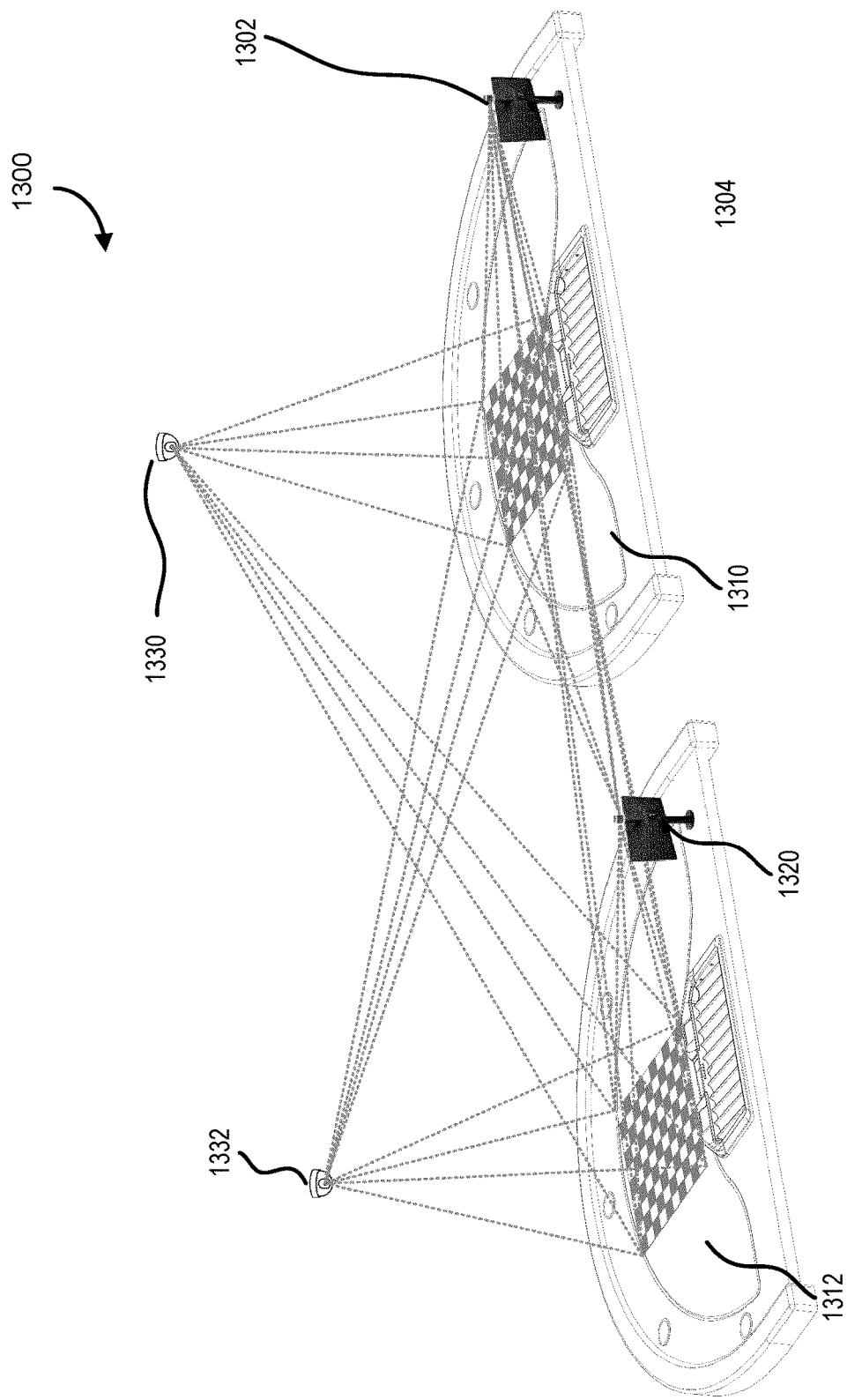

FIG. 13A-13C are diagrams of example system 1300 for tracking gaming on multiple gaming surfaces (e.g., a first gaming surface 1310 and a second gaming surface 1312), according to various embodiments.

In the shown embodiment, the imaging device 1302 has lines of sight 1304 and 1306 coinciding with the boundaries of the calibrating surface 1303, allowing the first imaging device 1302 to be calibrated to the first gaming surface 1310. Similarly, and possibly advantageously owing to being mounted on top of a display system, the imaging device 1302 has lines of sight of the second calibrating surface 1313 (shown for example as line of sight 1308), allowing the first imaging device 1302 to be calibrated to the second gaming surface 1312.

The first imaging device 1302 is shown in the corner of the first gaming surface 1310, such that the first imaging device 1302 has a line of sight of the second gaming surface 1312, which is unlikely to be impeded by players participating in the gaming at the first gaming surface 1310. The first imaging device 1302 may preferably be mounted, when used in the multi-imaging device system having a second gaming surface 1312, in a position having uninterrupted lines of sight of the second gaming surface 1312.

The imaging device 1302 may be calibrated to a variety of gaming surfaces within its field of view. For example, the imaging device 1302 may be calibrated to three gaming surfaces in a manner similar to calibrating the imaging device 13 for two gaming surfaces.

Referring now to FIG. 13B, in the embodiment shown, system 1300 includes the first imaging device 1302 and the second imaging device 1320. The respective imaging devices include lines of sight of both the first calibrating surface 1303 and the second calibrating surface 1313.

Advantageously, the system 1300 of FIG. 13B may allow for improved gaming activity monitoring as a result of having two imaging devices having fields of view capable of extracting duplicative data relative to features within the field of view.

Referring now to FIG. 13C, in the embodiment shown, system 1300 includes display mounted imaging devices 1302 and 1320, as well as aerial mounted imaging devices 1330 and 1332. Each of the imaging devices has a unique field of view of the first gaming surface 1310 and the second gaming surface 1312.

Advantageously, the system 1300 of FIG. 13C may allow for improved gaming activity monitoring as a result of imaging devices having fields of view capable of extracting duplicative data relative to features within the field of view.

Figure 14:
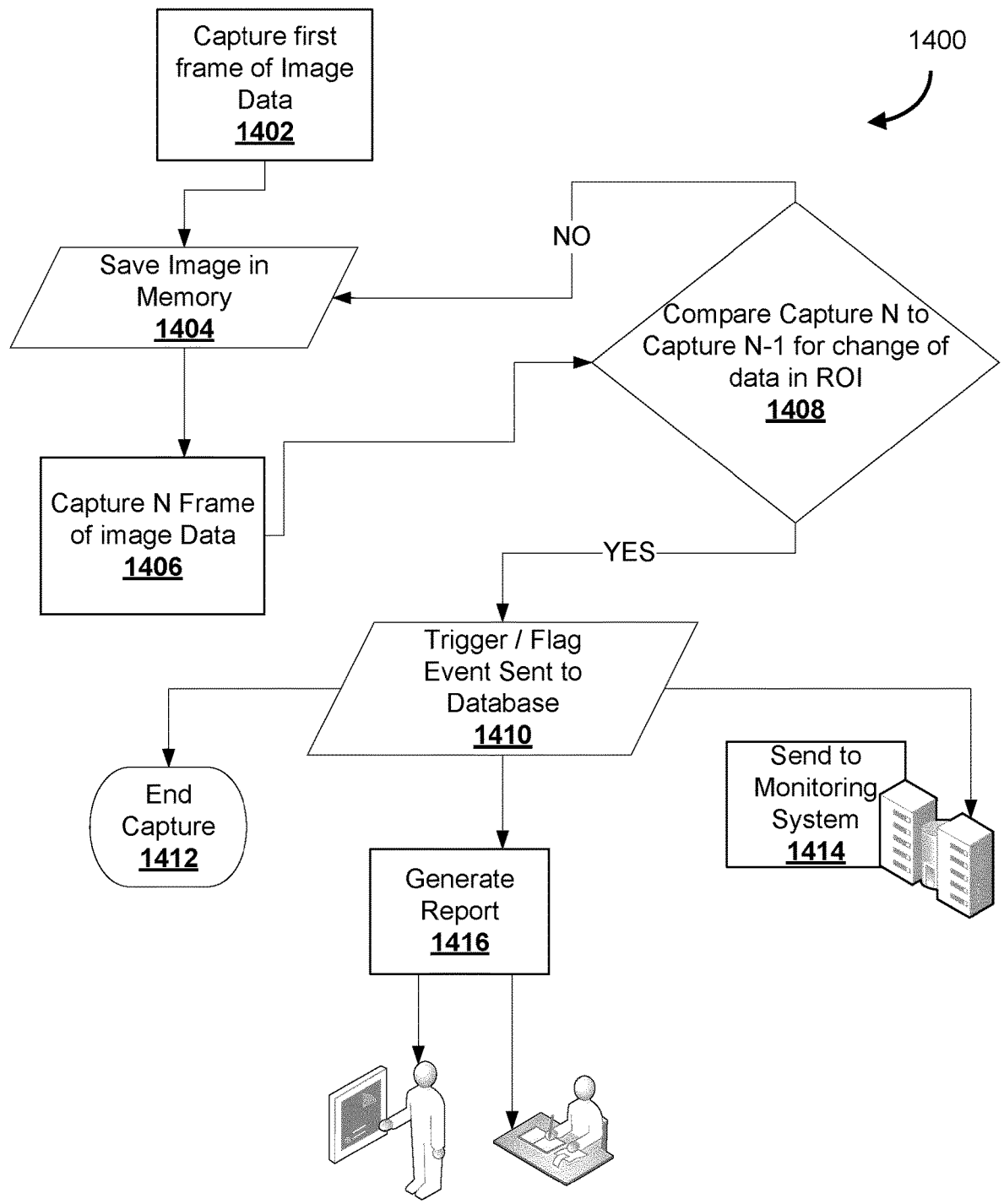
FIG. 14 is a process diagram illustrative of a method for detecting gaming infractions, according to some embodiments.

FIG. 14 is a process diagram illustrative of a method for detecting gaming infractions, according to some embodiments.

At step 1402, the processor 112 captures frame data from an imaging device (e.g., first imaging device 104-1). The capture frame data may be in the form of video data, such as, for example, an MP4 video data file.

At step 1404, the captured frame data (which can include frame data from multiple imaging devices associated with similar or overlapping, or discrete regions of interest) is saved to memory (e.g., at database 114). The processor 112 may be configured to store the capture frame data as soon as it is received, or alternatively the processor 112 may be configured to preprocess or compress the capture frame data prior to storage.

The captured frame data may be processed by the processor 112 and stored by incorporation by reference into the model representation. According to some embodiments, for example, the captured frame data is processed and only extracted features are stored in the model representation. The model representation may include metadata used to describe the relative sequence of the frame data, the source of the frame data, the physical properties of the source capturing the frame data (e.g., a resolution), and so forth.

At step 1406, the processor 112 may be configured to retrieve a subset of frame data from the memory for the extracted features. For example, the processor 112 may be configured to retrieve the most recent 10 seconds of frame data having the feature present. According to some non-limiting example embodiments, the processor 112 is configured to retrieve the most recent feature representation stored in memory (e.g., the previous second's frame data and detected feature).

The size of the subset of frame data (and model representation entries) retrieved from memory may be preconfigured, adjusted based on user input, or dynamically updated. For example, where the processor 112 is uncertain of whether an infraction threshold has been satisfied, the processor 112 may be configured to seek older frame data (and model representation entries) from the frame data stored in memory.

According to example embodiments, at step 1406, the processor 112 solely retrieves the model representation associated with the subset of frame data. For example, the processor 112 may retrieve from the model representation the last 4 stored representations of the extracted features.

At step 1408, the processor 112 compares the retrieved subset of frame data (or the model representation) to the captured frame data (or extracted features from the captured data frame) stored in memory step 1404 to determine whether the changes occurred within a region of interest. For example, in example embodiments where there is a single gaming surface (e.g. as shown in FIG. 11), the processor 112 compares the captured frame data with the retrieved subset of frame data to determine whether any features within the region of interest have changed.

In response to determining an absence of changes within the region of interest, the processor 112 may store the frame data and features captured in step 1402 to the memory as the updated model representation.

In response to determining that changes have occurred within the region of interest, the processor 112 may be configured to extract features from the frame data and determine whether the relevant threshold has been satisfied. Determining whether the relevant threshold has been satisfied may include the processor 112 sending the retrieved data to the processor within the monitoring system. In some embodiments, the processor 206 determines whether the relevant threshold has been breached.

At step 1410, the processor 112 creates a record of the relevant threshold being triggered by the capture frame data step 1402. For example the record may include time of the event, a type of event (e.g., as determined by a classifier), details of the notification provided by the processor 112 (e.g., when and to whom an alert was sent), and so forth.

According to some embodiments, for example, after the processor 112 has logged the trigger event, the processor closes event capture. For example, the system 1300 may be configured to shut down upon detecting features indicative of cheating occurring during the gaming.

The processor 112 may be capable of generating reports of logged events, as shown in step 1416. The reports may include any metadata stored in the record of the event, for example a set in step 1410.

The processor 112 may be configured to automatically send the reports to a preconfigured list of individuals or entities. For example, the processor 112 may be configured to send the event log to a pit boss at the end of the day.

In response to the processor 112 generating a record of the event at step 1410, the processor 112 may be configured to send the event to a monitoring system (not shown) at step 1414.

The monitoring system may be configured to track all events associated with a particular gaming participant and provide feedback to the processor 112 for determining subsequent infractions or thresholds associated with the particular participant. For example, where the monitoring system concludes that there are multiple pinching thresholds detected for a particular user, the monitoring system may instruct the processor 112 to lower a threshold used to determine pinching to maintain increased vigilance of the said individual.

In example embodiments, the monitoring system may aggregate the report data to determine trends. For example, the monitoring system may determine whether there is an increase in detected pinching events, and provide a warning (e.g., via a gaming employee oriented display system) to a gaming employee to be on heightened alert for pinching.

Figure 15:
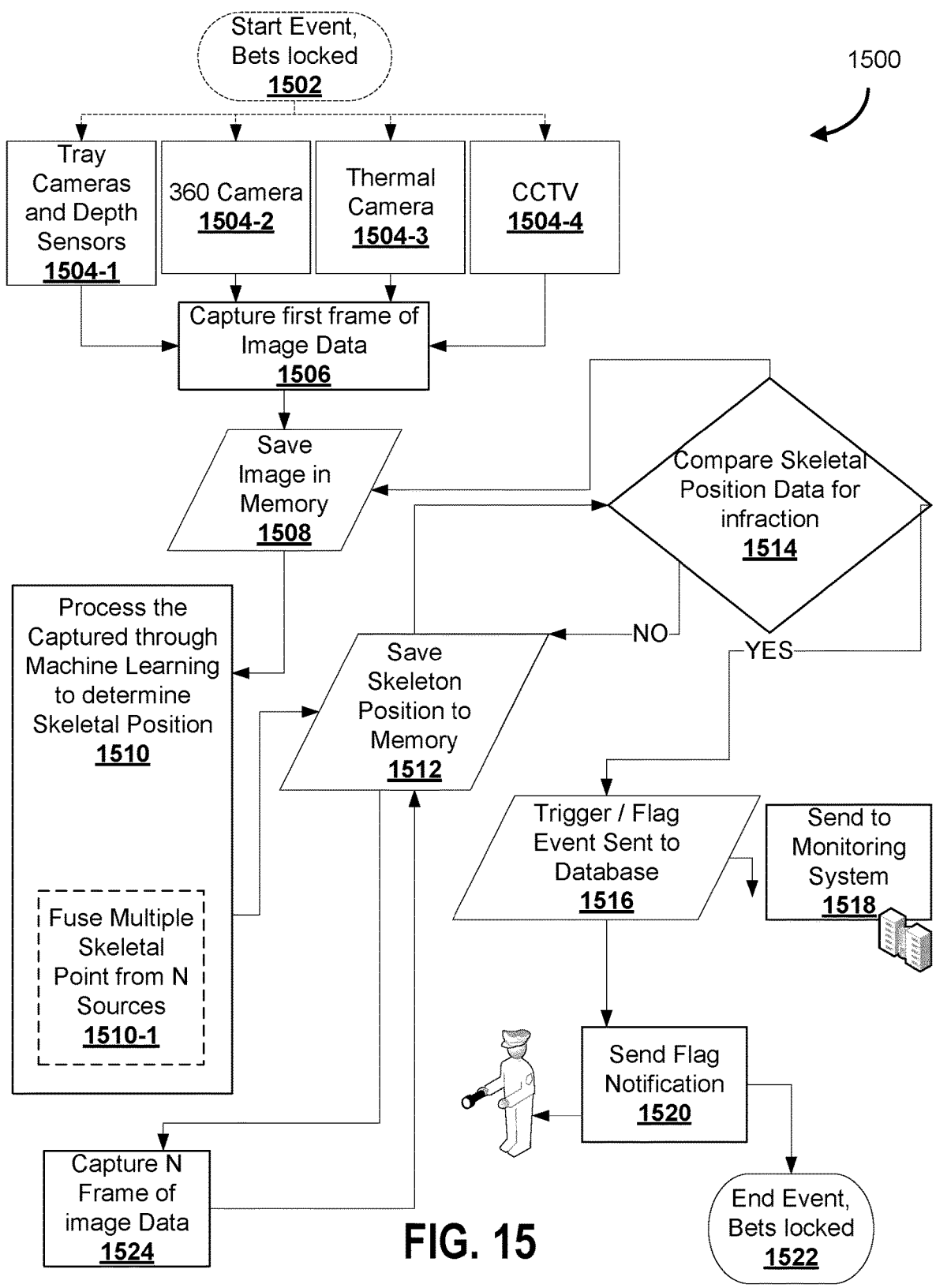
FIG. 15 is a process diagram illustrative of a method for detecting user features, according to some embodiments.

FIG. 15 is a process diagram illustrative of a method 1500 for detecting user features, according to some embodiments.

Optionally, at step 1502, the processor 112 determines whether a betting duration is commenced. For example, a dealer may press a button that incorporates the display system indicating that the betting duration (e.g., a blackjack hand commencing) is about to begin.

At step 1504, the imaging devices (e.g., trade cameras and deck sensors 1504-1, 360° camera 1504-2, an infrared camera 1504-3, and closed circuit television 1504-4) may be initiated to capture frame data. In example embodiments, the imaging devices are continuously capturing frame data without reference to whether a betting duration has commenced.

At step 1506, frame data from one or more imaging devices is captured.

At step 1508, the captured frame data stored in memory within the model representation.

At step 1510, the stored frame data is processed with a machine learning model to determine a skeletal position of any extracted gaming participant features within the frame data.

Optionally, as shown in step 1510-1, the machine learning model may be configured to generate the skeletal position within the time window represented by the frame data based on fusing multiple extracted features from multiple imaging device sources.

In example embodiments, the processor 112 processes the store the frame data with a classifier machine learning model pre-trained to detect and classify appendages of an individual. The processor 112 is further configured to, from the detected classified bodily appendage from multiple points of view, estimate the likely skeletal position of the bodily appendage as being in the middle of the detected appendage.

In some embodiments, the processor 112 determines the skeletal position based on an anatomical database (not shown) and the classified bodily appendage. For example, the processor 112 may be configured to determine the location of a nose of an individual in part based on existing anatomical information of the position of the nose relative to the position of an eye feature.

At step 1512, the processor saves the determined skeletal position to memory. The memory may be a database 114 local to the system 102, or the memory may be external to the system 102, such as an external database.

At step 1524, optionally, the processor 112, similar to step 1406 and method 1400, may be configured to retrieve or generate a subset of skeletal position stored in memory.

At step 1514, the processor 112 compares the subset of skeletal position data stored in memory to determine whether a threshold has been satisfied. For example, threshold may be an infraction threshold. In example embodiments, the threshold may be a gesture threshold, or a safety threshold.

Similar step 1410 in method 1400, at step 1516 the processor 112, in response to determining that a threshold has been satisfied, creates a record of the relevant threshold being triggered by the capture frame data.

Step 1518, similar to step 1414, includes the processor 112 sending the created record to a monitoring system.

At step 1520, the processor 112 may be configured to generate and transmit an alert. In example embodiments, the alert is a control signal used to control an actuator. For example, the alert may trigger the ringing of a bell in a security office. In some embodiments, for example, the alert is a notification, such as instructions to display a message of a screen, or an SMS sent to a pre-configured recipient, and so forth.

At step 1522, the processor 112 may be configured to suspend any new wagering (e.g., refused to accept new payments the contactless payment schemes). In example embodiments, the processor 112 transmits an alert identifying the gaming participants present when infraction was detected, and the amount of wagers in the game to a security office, where the bets can be locked until further resolution prior to a participant being allowed to cash out.

Figure 16A:
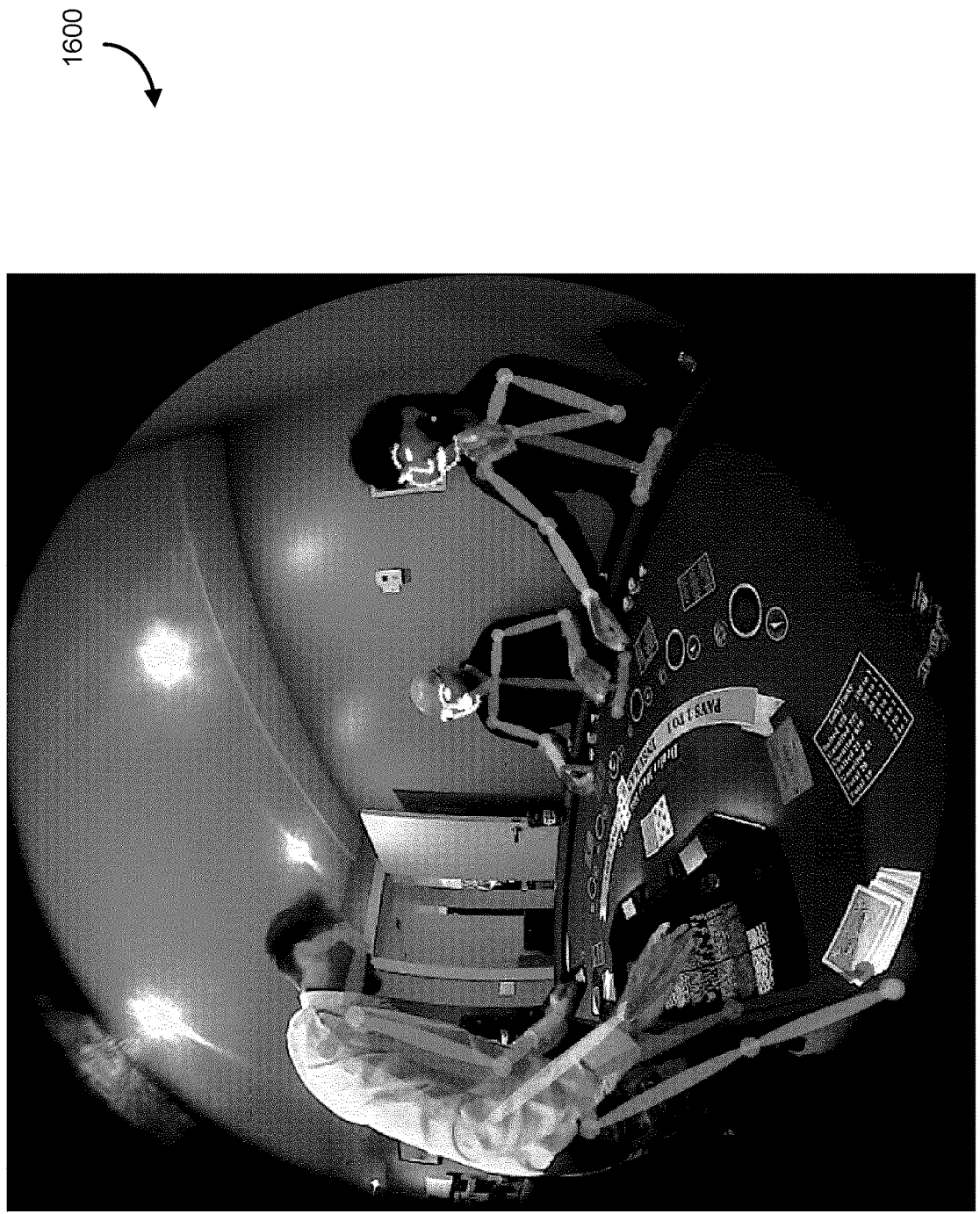
FIGS. 16A-16B are diagrams illustrative of detected gaming participant skeletal features, according to some embodiments.
Figure 16B:

FIG. 16A and FIG. 16B are diagrams illustrative of detected gaming participant skeletal features, according to some embodiments.

In the embodiment shown, a dealer gaming participant is shown as drawing a further card in furtherance of the gaming activity between FIGS. 16A and 16B. The skeletal features detected for the gaming participants include eyebrows, eyes, noses, and mouths. Further skeletal features are shown, including all bodily skeletal features visible in the field of view of the imaging device.

Figure 17:
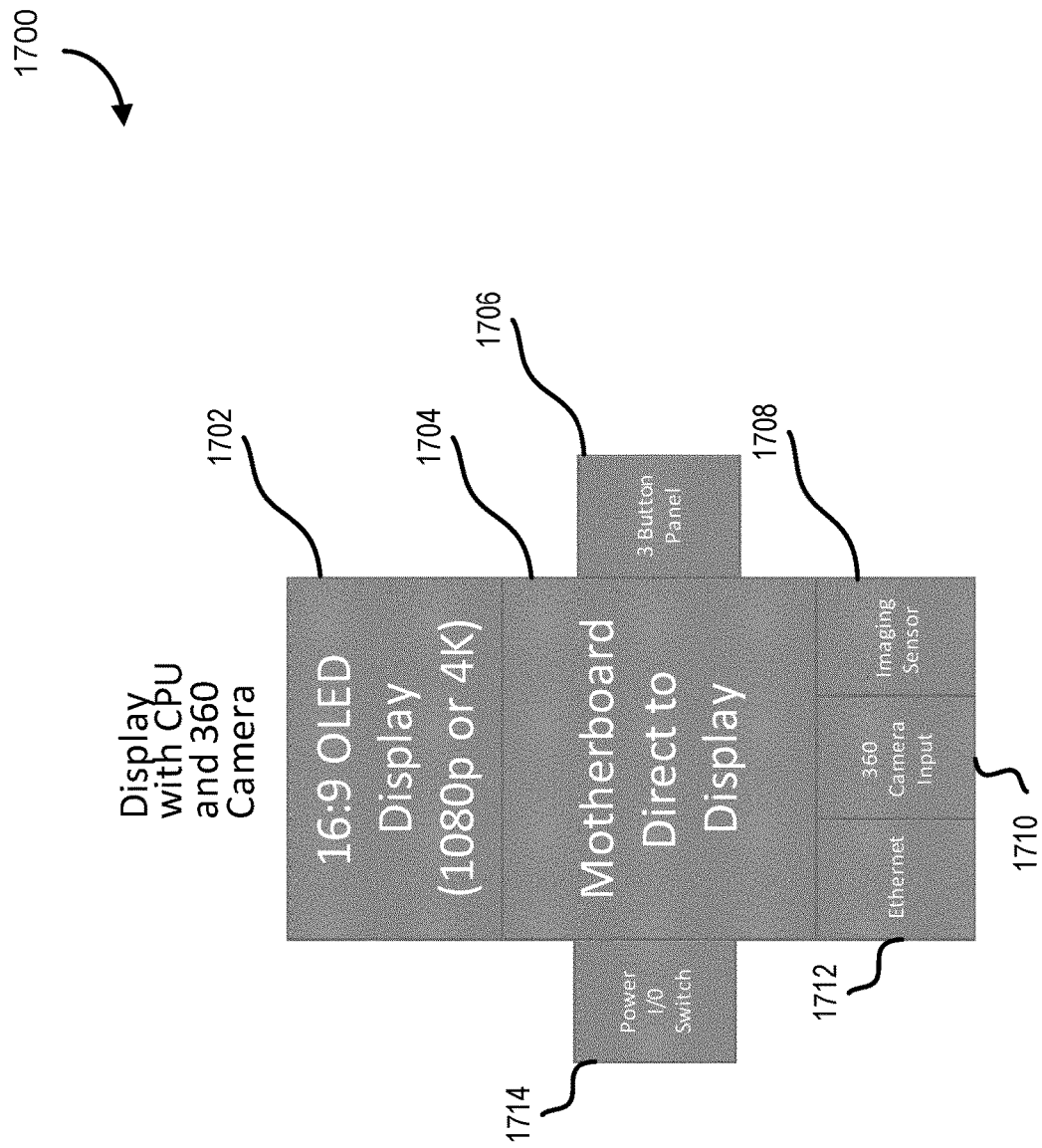
FIG. 17 is a component diagram of an example computing systems, according to example embodiments.

FIG. 17 is a component diagram of example computing system 1700, according to example embodiments.

System 1700 shown in FIG. 17 includes a display 1702 connected to a motherboard 1704. The motherboard 1704 may be in communication with various imaging devices and computer or networking components, for example through the use of imaging sensor port 1708, 360° camera input port 1710, and Ethernet port 1712.

The system 1700 may further include user operable interfaces, such as power switch 1714 and button panel 1706.

Figure 18:
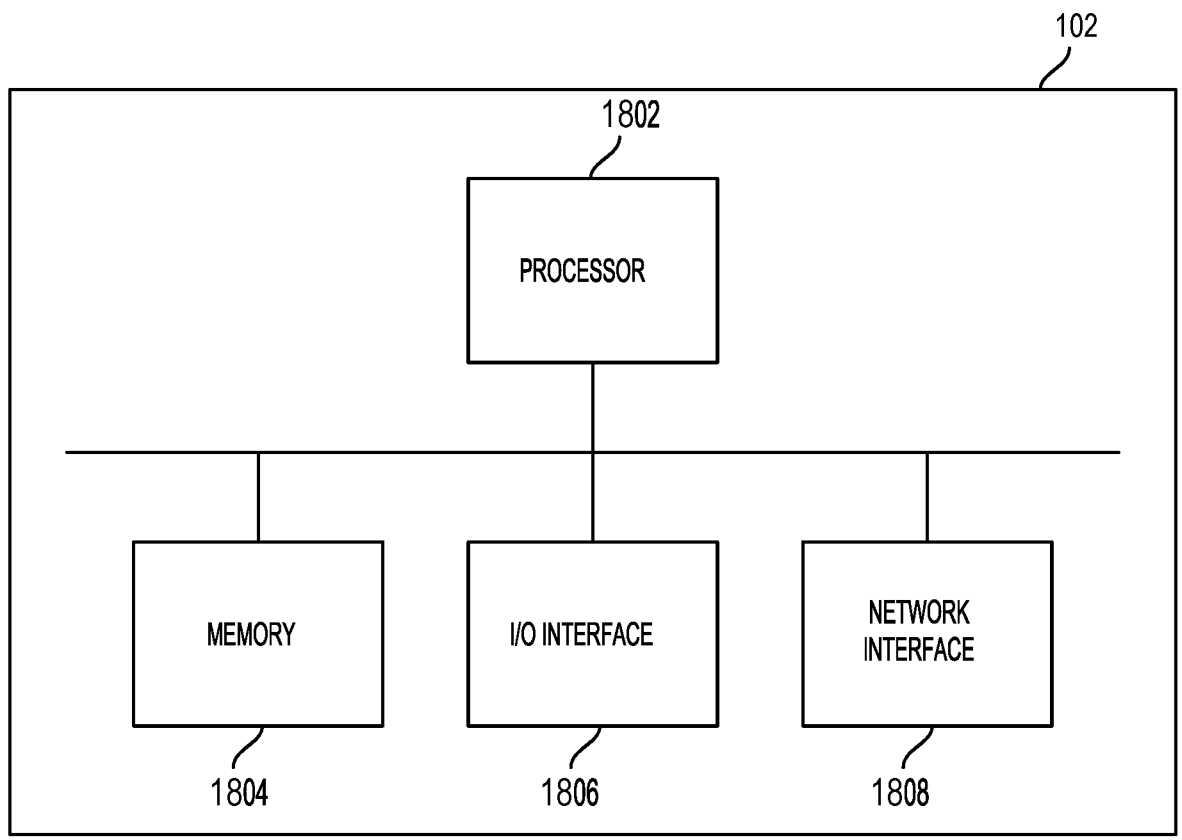
FIG. 18 is a further component diagram of an example computing system, according to example embodiments.

FIG. 18 is a schematic diagram of the system 102, in accordance with example embodiments.

As depicted, system 102 includes at least one processor 1802, memory 1804, at least one I/O interface 1806, and at least one network interface 1808.

Each processor 1802 may be, for example, a microprocessor or microcontroller (e.g., a special-purpose microprocessor or microcontroller), a digital signal processing (DSP) processor, an integrated circuit, a field programmable gate array (FPGA), a reconfigurable processor, a programmable read-only memory (PROM), or combinations thereof.

Memory 1804 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1806 enables system 102 to interconnect with one or more input devices, such as a keyboard, mouse, camera, touch screen and a microphone, or with one or more output devices such as a display screen and a speaker.

Each network interface 1808 enables system 102 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including combinations of these.

For simplicity only, one system 102 is shown but system for tracking gaming activity may include multiple servers 102. The servers 102 may be the same or different types of devices. The servers 102 may be connected in various ways including directly coupled, indirectly coupled via a network, and distributed over a wide geographic area and connected via a network (which may be referred to as "cloud computing").

For example, and without limitation, a system 102 may be a computing system, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

REFERENCES

[1] Tom Mertens, Jan Kautz, and Frank Van Reeth. 2007. Exposure Fusion. In Proceedings of the 15th Pacific Conference on Computer Graphics and Applications (PG '07). IEEE Computer Society, Washington, D.C., USA, 382-390. DOI: https://doi.org/10.1109/PG.2007.23

What is claimed is:

1. A network enabled digital signage device for monitoring gaming activities, the network enabled digital signage device comprising:
    a network interface adapter configured for electronic communication with at least one other camera having corresponding at least one other fields of view;
    a camera having at least a wide angle camera, the camera tracking, in a first field of view, physical objects placed on or proximate to a gaming surface;
    a computer processor configured to calibrate the camera and the at least one other camera by:
        identifying at least one overlapping region in the first field of view and the at least one other fields of view, the overlapping region capturing at least a portion of a calibrating surface;
        calibrating the camera based on the calibrating surface;
        calibrating the at least one other camera based on the calibrating surface; and
        establishing a common coordinate system for locating physical objects captured by either the camera or the at least one other camera, or both the camera and the at least one other camera.

2. The network enabled digital signage device of claim 1, wherein the calibrating surface is a regular polygon having known dimensions and geometry, and wherein the calibrating of the camera and the at least one other camera includes establishing, for each of the camera and the at least one other camera, a corresponding perspective transform matrix, the corresponding perspective transform matrix to be stored in computer memory and utilized for converting coordinate values into the common coordinate system.

3. The network enabled digital signage device of claim 2, wherein the calibrating surface has one or more colors, and wherein the calibrating of the camera and the at least one other camera includes establishing, for each of the camera and the at least one other camera, a corresponding color transform matrix, the corresponding perspective color matrix to be stored in computer memory and utilized for converting color values into a common color system.

4. The network enabled digital signage device of claim 1, wherein the camera and the at least one other camera operate in concert to track physical objects within the first field of view or the at least one other fields of view, and convert visual characteristics of the physical objects from captured images into a spatial model using the common coordinate system.

5. The network enabled digital signage device of claim 3, wherein the camera and the at least one other camera operate in concert to track physical objects within the first field of view or the at least one other fields of view, and convert visual characteristics of the physical objects from captured images into a spatial and color corrected model using the common coordinate system and the common color system.

6. The network enabled digital signage device of claim 1, wherein the first field of view or the at least one other fields of view captures one or more physical game objects, each physical game object has one or more associated visual characteristics, including at least a game value, and wherein a corresponding rectified image of the one or more physical game objects based on the common coordinate system, and the corresponding rectified image is utilized for pattern recognition to computationally estimate the one or more associated visual characteristics of the corresponding physical game object.

7. The network enabled digital signage device of claim 6, wherein the one or more physical game objects are playing cards, and wherein the one or more associated visual characteristics includes at least card values, card orientation, card face, physical dimensions, or physical surface visual artifacts.

8. The network enabled digital signage device of claim 7, wherein the one or more associated visual characteristics includes the physical surface visual artifacts, and the physical surface visual artifacts corresponding to a physical game object is utilized to generate a score indicative of at least one of wear, damage, or modification based on a automated comparison of the physical game object to a reference physical game object.

9. The network enabled digital signage device of claim 7, wherein movements or interactions with the one or more physical game objects are recorded and the moved or interacted with one or more physical game objects are marked as used.

10. The network enabled digital signage device of claim 9, wherein the one or more physical game objects marked as used are removed from play, and the processor is configured to count removed game objects and new game objects to determine whether a 1:1 ratio of cards removed and new is maintained, and if the 1:1 ratio of cards removed and new is not maintained, the processor is further configured to trigger an abnormality alert.

11. A network enabled method for monitoring gaming activities by controlling a camera having at least a wide angle camera, the camera tracking, in a first field of view, physical objects placed on or proximate to a gaming surface that is in electronic communication with at least one other camera having corresponding at least one other fields of view, the network enabled method comprising:
calibrating the camera and the at least one other camera by:
identifying at least one overlapping region in the first field of view and the at least one other fields of view, the overlapping region capturing at least a portion of a calibrating surface;
calibrating the camera based on the calibrating surface;
calibrating the at least one other camera based on the calibrating surface; and
establishing a common coordinate system for locating physical objects captured by either the camera or the at least one other camera, or both the camera and the at least one other camera.

12. The network enabled method of claim 11, wherein the calibrating surface is a regular polygon having known dimensions and geometry, and wherein the calibrating of the camera and the at least one other camera includes establishing, for each of the camera and the at least one other camera, a corresponding perspective transform matrix, the corresponding perspective transform matrix to be stored in computer memory and utilized for converting coordinate values into the common coordinate system.

13. The network enabled method of claim 12, wherein the calibrating surface has one or more colors, and wherein the calibrating of the camera and the at least one other camera includes establishing, for each of the camera and the at least one other camera, a corresponding color transform matrix, the corresponding perspective color matrix to be stored in computer memory and utilized for converting color values into a common color system.

14. The network enabled method of claim 11, wherein the camera and the at least one other camera operate in concert to track physical objects within the first field of view or the at least one other fields of view, and convert visual characteristics of the physical objects from captured images into a spatial model using the common coordinate system.

15. The network enabled method of claim 13, wherein the camera and the at least one other camera operate in concert to track physical objects within the first field of view or the at least one other fields of view, and convert visual characteristics of the physical objects from captured images into a spatial and color corrected model using the common coordinate system and the common color system.

16. The network enabled method of claim 11, wherein the first field of view or the at least one other fields of view captures one or more physical game objects, each physical game object has one or more associated visual characteristics, including at least a game value, and wherein a corresponding rectified image of the one or more physical game objects based on the common coordinate system, and the corresponding rectified image is utilized for pattern recognition to computationally estimate the one or more associated visual characteristics of the corresponding physical game object.

17. The network enabled method of claim 16, wherein the one or more physical game objects are playing cards, and wherein the one or more associated visual characteristics includes at least card values, card orientation, card face, physical dimensions, or physical surface visual artifacts.

18. The network enabled method of claim 17, wherein the one or more associated visual characteristics includes the physical surface visual artifacts, and the physical surface visual artifacts corresponding to a physical game object is utilized to generate a score indicative of at least one of wear, damage, or modification based on a automated comparison of the physical game object to a reference physical game object.

19. The network enabled method of claim 17, wherein movements or interactions with the one or more physical game objects are recorded and the moved or interacted with one or more physical game objects are marked as used.

20. A non-transitory computer readable medium storing machine interpretable instructions, which when executed by a processor, cause the processor to perform a method for monitoring gaming activities by controlling a camera having at least a wide angle camera, the camera tracking, in a first field of view, physical objects placed on or proximate to a gaming surface that is in electronic communication with at least one other camera having corresponding at least one other fields of view, the method comprising:

calibrating the camera and the at least one other camera by:
        identifying at least one overlapping region in the first field of view and the at least one other fields of view, the overlapping region capturing at least a portion of a calibrating surface;
        calibrating the camera based on the calibrating surface;
        calibrating the at least one other camera based on the calibrating surface; and
    establishing a common coordinate system for locating physical objects captured by either the camera or the at least one other camera, or both the camera and the at least one other camera.

\* \* \* \* \*